(12) United States Patent
Bi

(10) Patent No.: US 7,099,084 B2
(45) Date of Patent: Aug. 29, 2006

(54) DIFFRACTIVE WAVE MODULATING DEVICES

(76) Inventor: Baokang Bi, 3928 E. Sunwind Dr., Okemos, MI (US) 48864

( * ) Notice: Subject to any disclaimer, the term of this patent is extended or adjusted under 35 U.S.C. 154(b) by 25 days.

(21) Appl. No.: 10/707,257

(22) Filed: Dec. 1, 2003

(65) Prior Publication Data

US 2005/0117223 A1    Jun. 2, 2005

(51) Int. Cl.
*G02B 27/44* (2006.01)
*G02B 26/02* (2006.01)

(52) U.S. Cl. .................. 359/565; 359/572; 359/230; 359/213

(58) Field of Classification Search ............... 359/565, 359/572, 230, 231, 236, 233, 576, 566, 569, 359/227, 232
See application file for complete search history.

(56) References Cited

U.S. PATENT DOCUMENTS

| | | | |
|---|---|---|---|
| 5,311,360 A | 5/1994 | Bloom et al. | |
| 5,360,973 A | 11/1994 | Webb | |
| 5,459,610 A | 10/1995 | Bloom et al. | |
| 5,684,631 A * | 11/1997 | Greywall | 359/565 |
| 5,794,023 A * | 8/1998 | Hobbs et al. | 359/565 |
| 5,841,579 A | 11/1998 | Bloom et al. | |
| 5,900,637 A | 5/1999 | Smith | |
| 6,169,624 B1 | 1/2001 | Godil et al. | |
| 6,177,980 B1 | 1/2001 | Johnson | |
| 6,501,600 B1 | 12/2002 | Godil et al. | |
| 6,611,377 B1 | 8/2003 | Chung | |
| 2002/0071172 A1 | 6/2002 | Naiki | |

OTHER PUBLICATIONS

R. W. Wood, "Phase-Reversal Zone-Plate, and diffraction-Telescopes", Philosophical Magazine and Journal of Science, vol. 45, p. 511, 1898.
Dario Gil et al., "Parallel maskless optical lithography for prototyping, low-volume production, and research", Journal of Vacuum Science and Technology B, vol. 20(6), p. 2597, Nov./Dev 2002.
Henry I. Smith, "A proposal for maskless, zone-plate-array nanolithography", Journal of Vacuum Science and Technology B, vol. 14(6), p. 4318, Nov./Dev 1996.
Janos Kirz, "Phase zone plates for x rays and the extreme uv", Journal of Optical Society of America, vol. 64, p. 301, 1974.
O. Solgaard et al., "Deformable grating optical modulator", Optics Letters, vol. 17, No. 9, p. 688, May 1992.
Stephen D. Senturia, "Microsystem Design", Kluwer Academic Publisher, Boston, 2000.
Margit Ferstl et al., "Static and Dynamic Fresnel zone lenses for optical interconnetions", Journal of Modern Optics, vol. 43, No. 7, p. 1451, 1996.

* cited by examiner

*Primary Examiner*—Audrey Chang

(57) ABSTRACT

A zone plate modulator modulates an incident wave by changing the relative distance between a pair of complementary reflective zone plates. The modulator acts to reflect the incident wave as a plane mirror in a first configuration, and to diffract the incident wave into a series of focal points along the axis of the modulator as a phase zone plate in a second configuration. A force applied to the zone plates changes the zone plate modulator between the first and second configurations, therefore modulating the incident wave. The force can be an electrostatic force generated by a voltage source. An array of zone plate modulator elements is a compact spot array generator performing both the modulating and focusing functions. An achromatic zone plate modulator provides a both wavelength and polarization independent modulation of the incident wave. A variable optical attenuator comprises achromatic zone plate modulators.

21 Claims, 41 Drawing Sheets

DIFFRACTIVE WAVE MODULATING DEVICES

BACKGROUND OF THE INVENTION (1) Field of the Invention

The present invention relates to devices for modulating waves. In particular, the present invention relates to devices that use a pair of complementary zone plates to perform such modulation.

(2) Brief Description of Prior Art

In recent years, spot array generators have attracted lots of attentions in the fields of high-speed and high-resolution image generation owing to their unique capabilities of being able to generate large field images with a very high resolution by providing a massive amount of image pixels in a parallel fashion.

Shown in FIG. 1 is an illustration of a conventional spot array generating system 100 having 4 pixels. A spot array 102 is an image formed by a lens array 104 on the array's focal plane 106 when the lens array 104 is illuminated by light beams 108. The lenses in the array can be either refractive or diffractive. In order to generate dynamic images for the purpose of high-resolution image generation, it is necessary to provide means for modulating the individual light spots in the spot array. In the conventional spot array generating systems as shown in FIG. 1, a spatial light modulator (SLM) 110 is placed in series with the lens array 104 and is used to modulate the light intensity of each spots. Additional components such as lens systems 112, and aperture arrays 114 may be needed in order to provide the pixel-to-pixel matching between the SLM 110 and the lens array 104 and to eliminate unwanted light.

For example, Darioi Gil, et al., *J. Vac. Sci. Technol.* B(20), p 2597(2002), demonstrated a lithographic apparatus employing a combination of a Grating Light Valve array and a zone plate array. Kenneth C. Johnson (U.S. Pat. No. 6,177,980, issued on Jan. 23, 2003) proposed a lithographic system using a combination of various SLM arrays with a microlens array. Even though the functionality of some of these combinations has been successfully demonstrated, there are serious limitations to these approaches. Commercial applications usually require a resolution that is at least as high as the resolutions of today's commonly used display formats. For example, it is preferable to use a display having a resolution of 1024×768 pixels, or a total of 786,432 pixels. To combine a lens array with a SLM, both of which have a very large number of pixels, precise alignment between the components is critical. Such a mechanical arrangement is vulnerable to environmental effects such as temperature changes and mechanical vibrations. Therefore, the precise alignment is often difficult to maintain. Besides, the needs for additional necessary optical components such as lens systems and aperture arrays result in the loss of optical efficiency, increased system size, complexity and cost. The invention of Henry Smith (U.S. Pat. No. 5,900,637, issued on May 4, 1999) addressed some of the issues by integrating a micro-shutter array with a zone plate array. The proposed micro-shutters electronically rotate a micro-plate substantially in or out of the light path of each lens elements in order to turn the corresponding light spot OFF or ON. This type of SLM is not expected to have a fast response time due to the required large mechanical motion of the micro-plate in order to achieve a full modulation. And the fabrication process of the integrated lens array and micro-shutters is quite complex.

Spot array generating systems using a combination of a lens array and a SLM have many other disadvantages. For example, microlens arrays are arrays of diffractive lenses. They are difficult to manufacture, especially for large arrays of diffraction limited lenses. Their fabrication process is not compatible at all with the CMOS technology. On the other hand, existing SLMs have their shortcomings as well. Digital micromirror arrays, such as the DLP™ manufactured by Texas Instruments, TX, is not very fast due to the large motions needed to modulate the light beams. The Grating Light Valve (GLV) array manufactured by Silicon Light Machines, CA, has a very short response time. However due to the asymmetrical ribbon design, GLVs are not appropriate for 2D arrays and are also not polarization independent. Liquid crystal based SLMs modulate light by changing the orientation of molecules, and consequently have significant polarization losses.

Therefore, for applications of high performance image generation systems, it is desirable to have a spot array generating device that is very compact, reliable, and easy to use. Preferably it is a single integrated device that is capable of both modulating and focusing an incoming wave. It is also desirable to have a spot array generating device that is suitable for 2-D arrays, has a very short response time, and is polarization independent. It is still desirable to have a spot array generating device that is low cost, easy to fabricate, and compatible with CMOS technology. Currently there is no prior art that satisfies these features numerated above.

Fresnel zone plates, or zone plates for short, were invented more than a century ago. As described by most optics textbooks, a zone plate is a transparent plate with a set of concentric zones made opaque to the incident wave. This type of zone plates is sometimes referred to as amplitude zone plates. The outer radius Rn of the nth zone is determined by the following zone plate equation $$R_n = \left(n\lambda F + \frac{n^2\lambda^2}{4}\right)^{1/2}$$

where n is a positive integer, λ is the wavelength of the incident wave, and F is the focal length of the primary focal point of the zone plate. It commonly refers to the zones that have an even index n as the even zones, and the zones that have an odd index n as the odd zones. The size ds of the diffraction limited spot formed by a zone plate is governed by the same equation for refractive lenses, ds=λ/NA, where NA is the numerical aperture of the zone plate. A zone plate is a diffractive optics. It also behaves like a lens capable of forming images and focusing waves.

Illustrated in FIG. 2 is a typical transmissive amplitude zone plate 140 under the illumination of an incident wave. The incident wave 142 is diffracted by the clear zones 144 into a series of focal points 146, 147, and 148, with most of the energy being at the first or the primary focal point 148. A corresponding set of virtual focal points, formed on the right-hand side of the zone plate, is not shown here for clarity. Such a zone plate also carries a substantial amount (~25%) of plane wave component in the forward direction. Since half of the incident wave is blocked by the opaque zones 149, this type of zone plates is not very efficient. To overcome the problem of low efficiency, a phase-reversal zone plate was proposed in 1888 by Lord Rayleigh and demonstrated in 1898 by R. W. Wood, *Philos. Mag.* V45, 51(1898). The basic idea of a phase-reversal zone plate is to convert the opaque zones into transparent zones, and also change the phase of the waves passing through them by 180 degrees. A constructive interference between the diffracted waves coming from the clear zones and those coming from the phase-reversed zones results in a four-fold increase in the intensity of waves at the focal points. Phase-reversal zone plates are often simply referred to as phase zone plates. Phase zone plates have been used frequently in X-ray optics.

It should be noted that all of above descriptions for transmissive zone plates can be used to describe the properties of reflective zone plates. For example, the waves leaving a reflective zone plate consist of both diffracted and reflected waves. The diffracted waves form a series of focal points along the axis of the reflective zone plate.

A major limitation of both amplitude zone plates and phase zone plates is that the intensities at the focal points of the zone plates are fixed once the zone plates are made, and can not be changed dynamically. Improvements by several inventors provided certain degree of dynamics to zone plates. For example, Dennis S. Greywall (U.S. Pat. No. 5,684,631, issued on Nov. 4, 1997) invented an optical modulator/switch including a reflective zone plate. The modulator modulates a light beam by changing the orientation of the reflective zone plate, therefore the angular positions of the focal points of the zone plate. This type of modulator/switch can be used for multiplexing or switching optical signals. However, it is not suitable for generating spot arrays. George W. Webb (U.S. Pat. No. 5,360,973, issued on Nov. 1, 1994) proposed a dynamic zone plate deflector made of a semiconductor material for forming and scanning millimeter wave radiation. The idea is to spatially modulate the density of charge carriers, and therefore the dielectric property of the semiconductor material. However, the invention can not be used for radiation of shorter wavelength such as visible light or ultraviolet light since these radiation can not pass through the semiconductor materials. Toshio Naiki (U.S. Pub. No. 2002/0071172, published on Jun. 13, 2002) disclosed a diffractive optical device based on the acoustooptical effect of certain materials such as Lithium Niobate. By changing the frequency of a radio frequency (RF) signal applied to a circular interdigital transducer fabricated on an acoustooptical material, the focal length of the diffractive optical device is changed or modulated. Since the acoustooptical effect is a weak effect (only a few percent), the modulation is quite small. The requirement of RF electronics also makes it impractical to integrate such diffractive optical devices into a large array. Therefore, prior art of dynamic zone plates failed to provide a modulator that is suitable for being used as spot array generators.

(3) OBJECTS AND ADVANTAGES

Accordingly, it is the object of this invention to provide an integrated modulator/dynamics zone plate that acts as both a modulator and a focusing lens. An array of such integrated modulator elements can be used as a sport array generator, replacing entirely the conventional combination of discrete elements of lens arrays, SLMs, and the associated optical components, and eliminating the needs of precision alignment. The present invention greatly reduces the size, and improves the stability, reliability, and handling capability of the modulator.

A further object of this invention is to provide a modulator that can generate diffraction limited spot and gray level output, operates at high speed (response time of less than one microsecond), has high contrast ratio, and is polarization independent.

Another object of this invention is to provide a modulator that is easy to fabricate, compatible with CMOS technology, and can be volume produced.

Yet another object of this invention is to provide a modulator which is both polarization independent and wavelength independent, and can be used with fiber optic technology.

Further objects and advantages of the present invention will become apparent from the following detailed description taken in conjunction with the accompanying drawings, illustrating, by way of examples, the principles of the invention.

SUMMARY OF THE INVENTION

The present invention relates to a wave modulator that comprises a pair of complementary reflective zone plates. The modulator performs the functions of both a modulator and a focusing lens, therefore greatly reducing the size, simplifying the design, lowering the cost, and improving the performance of optical systems that incorporate such modulators. The present invention also provides arrays of zone plate modulator elements, which can be used as compact and high performance spot array generators. The present invention further provides a modulator that is both polarization and wavelength independent, making it especially suitable for the fiber optic technology. The modulators described by the present invention can be micromachined using the CMOS compatible processing techniques and can be manufactured on large scale.

BRIEF DESCRIPTIONS OF THE DRAWINGS

DETAILED DESCRIPTION OF THE INVENTION

The present disclosure is divided into three different, yet related sections. The first section describes a diffractive modulator comprising a pair of complementary reflective zone plates. The second section describes a diffractive modulating device comprising a plurality of the diffractive modulators described in Section one. The third section describes an achromatic diffractive modulator comprising a pair of complementary reflective zone plates. The zone plates are arranged in such a manner that the modulator attenuates an incoming wave independent of wavelength and polarization of the incoming wave.

I. A Zone Plate Modulator

Figure 3A:
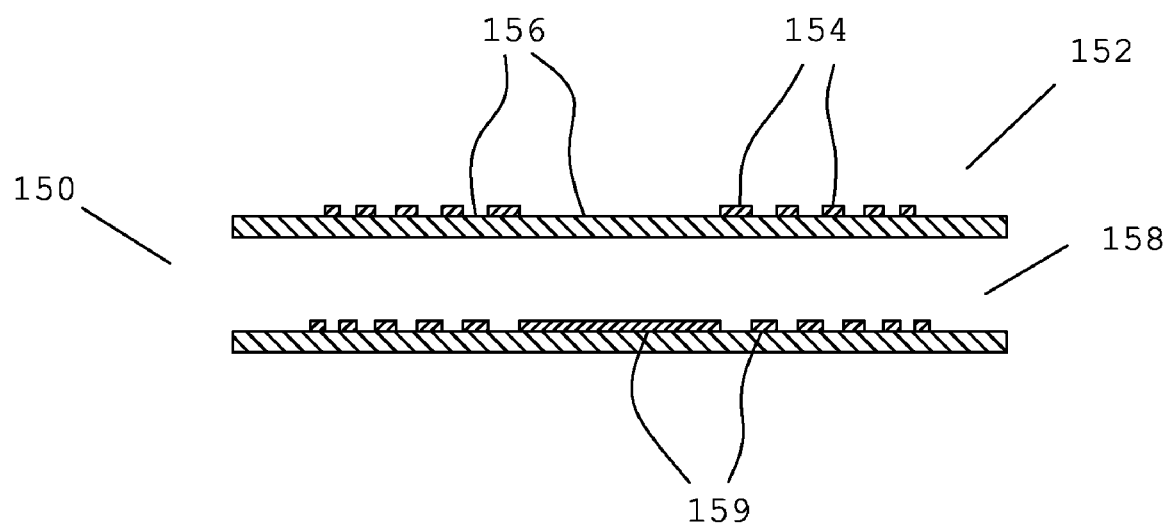
FIG. 3a shows a pair of complementary zone plates.
Figure 3B:
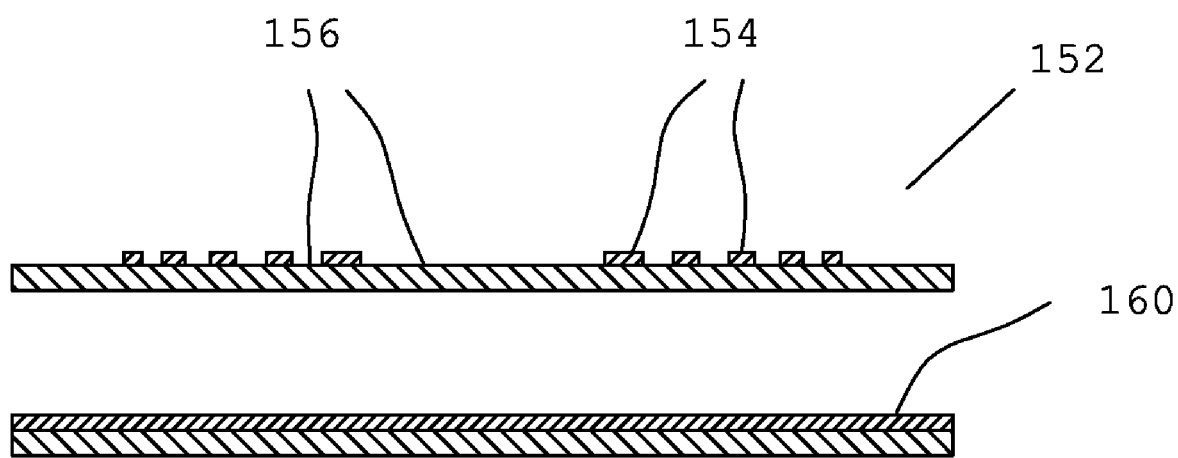
FIG. 3b shows a pair of complementary zone plates with the second zone plate being replaced by a mirror.

The present invention provides a diffractive modulator comprising a pair of complementary reflective zone plates. A pair of complementary reflective zone plates 150 is defined according to FIG. 3a. The first reflective zone plate is a zone plate 152 on which the alternate zones 154 (for example, the even zones) are reflective and the remaining zones 156 (for example, the odd zones) are transmissive. Whereas, the opposite zones 159 (for example, the odd zones) on the second reflective zone plate 158 are reflective. The first reflective zone plate 152 is positioned above the second reflective zone plate 158, and is aligned with the second reflective zone plate so that the centers of both zone plates are on the same axis perpendicular to the zone plates. The radii of the zones on both zone plates are designed with similar parameters so that when the two zone plates are superimposed on top of each other at their centers, they form a complete mirror. When an incident wave impinges upon the pair of complementary reflective zone plates, half of the incident wave is reflected by the first zone plate 152. The other half passes through the first zone plate 152, is reflected by the second zone plate 158, and passes through the first zone plate 152 again. Then the waves reflected from both zone plates combine together. It should be clear to the one skilled in the art that the respective reflective and transmissive zones on a pair of complementary zone plates can be interchanged producing the same wave effect. An improvement to the above complementary reflective zone plates is shown in FIG. 3b. A mirror 160 is used to substitute the second reflective zone plate. Since the transparent zones 156 of the first reflective zone plate 152 determine the active regions on the mirror, it automatically creates a self-aligned zone plate on the mirror 160 that is complementary to the first zone plate 152. The improvement greatly simplifies the construction of the zone plates and also eliminates the need of alignment between the zone plates.

PREFERRED EMBODIMENT

Figure 4:
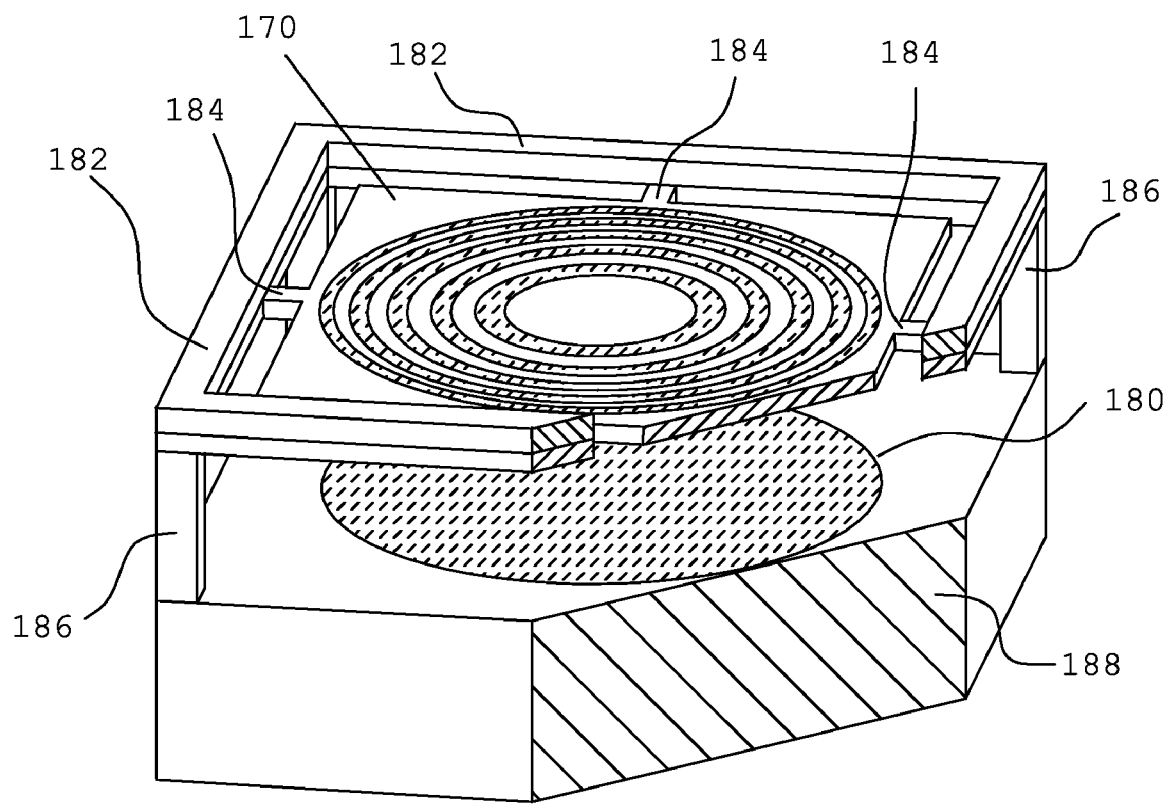
FIG. 4 is a perspective view of a micromachined zone plate modulator according to the preferred embodiment of the present invention.
Figure 5A:
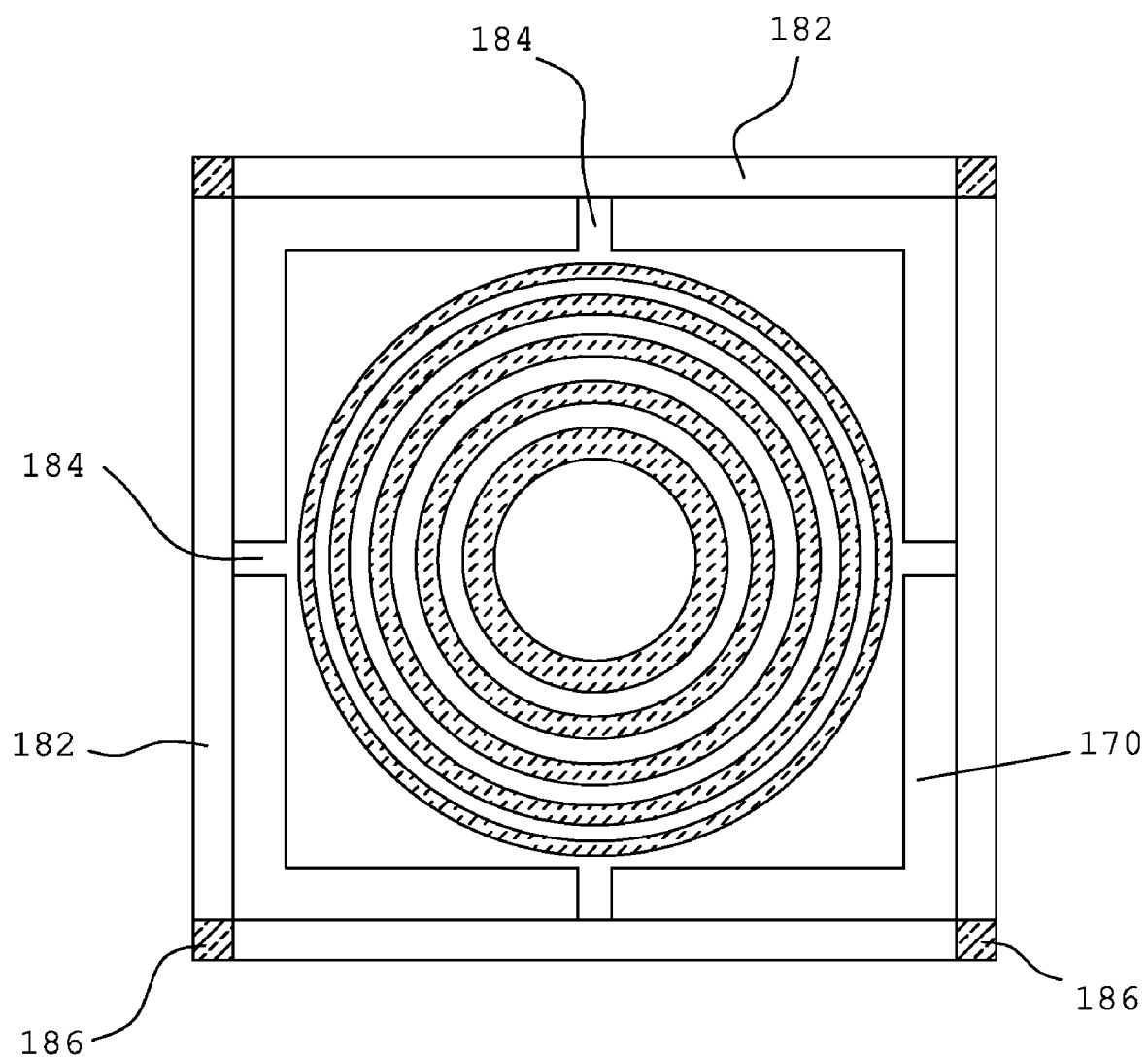
FIG. 5a is the top view of the micromachined modulator shown in FIG. 4.
Figure 5B:
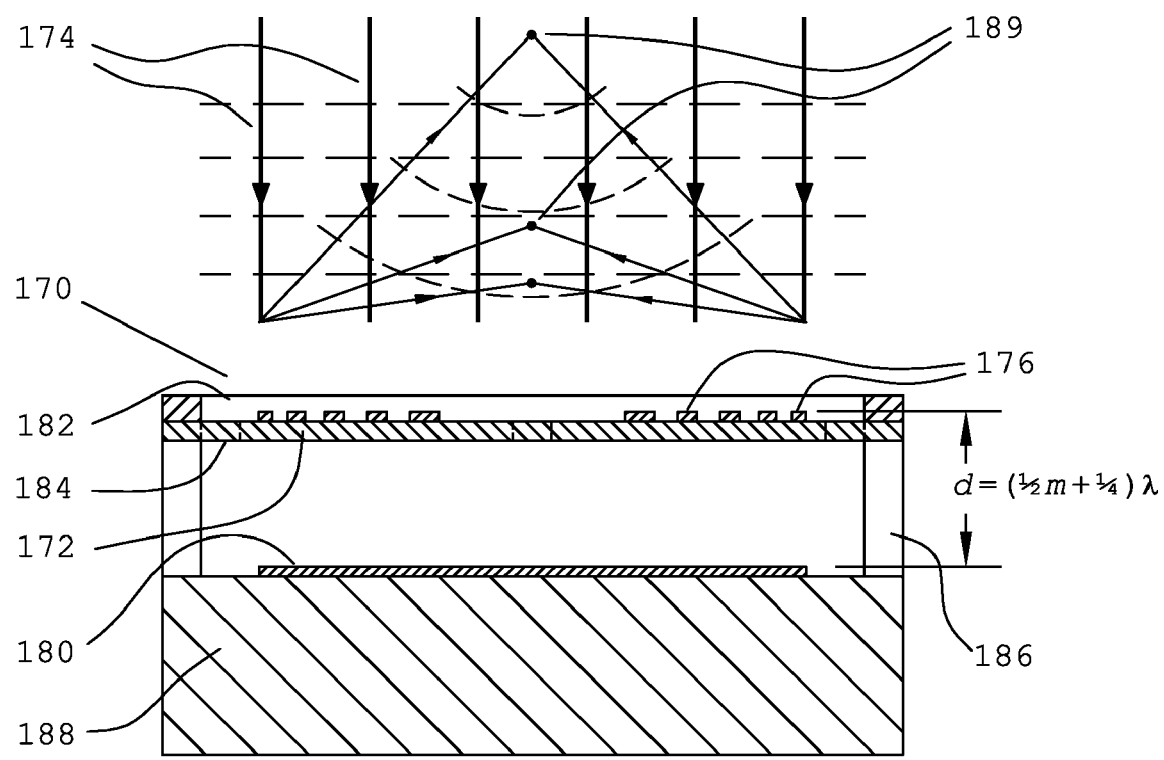
FIG. 5b is a cross-sectional view of the micromachined modulator shown in FIG. 4 when the first zone plate assembly is in the un-deflected position.

The preferred embodiment according to the present invention is shown in a prospective view in FIG. 4. The modulator can be micromachined using microelectromechanical system (MEMS) fabrication processing methods. The top view of the preferred embodiment in FIG. 5a shows a first reflective zone plate assembly 170 being connected to four deformable resilient beams 182 by linkages 184. The deformable resilient beams 182 are supported by posts 186 at the ends of the beams. The cross-sectional view in FIG. 5b shows that the first zone plate assembly 170 includes a transparent conductive layer 172, which serves both as an electrode and a mechanical support for the reflective zones 176. The reflective zones 176 have a substantially reflective surface, and are on top of the support layer 172. Also shown in FIG. 5b is a mirror 180 on top of a substrate 188. The mirror 180 serves as the second reflective zone plate, and is complementary to the first reflective zone plate 170. The cross-sectional view of FIG. 5b further reveals that the first zone plate assembly 170 is suspended above the mirror 180 by deformable resilient beams 182 via linkages 184. The deformable resilient beams 182 are anchored to the substrate 188 by posts 186 at the ends of the deformable resilient beams 182. The transparent electrode 172 on the first reflective zone plate assembly 170, and the metallic mirror 180 on the substrate form a parallel plate capacitor. Alternatively, a substantially conductive substrate, such as silicon, can be used to serve as the second electrode. The mechanical property of the transparent conductive layer 172 can be further enhanced by adding a dedicated transparent mechanical support layer (not shown).

Figure 5C:
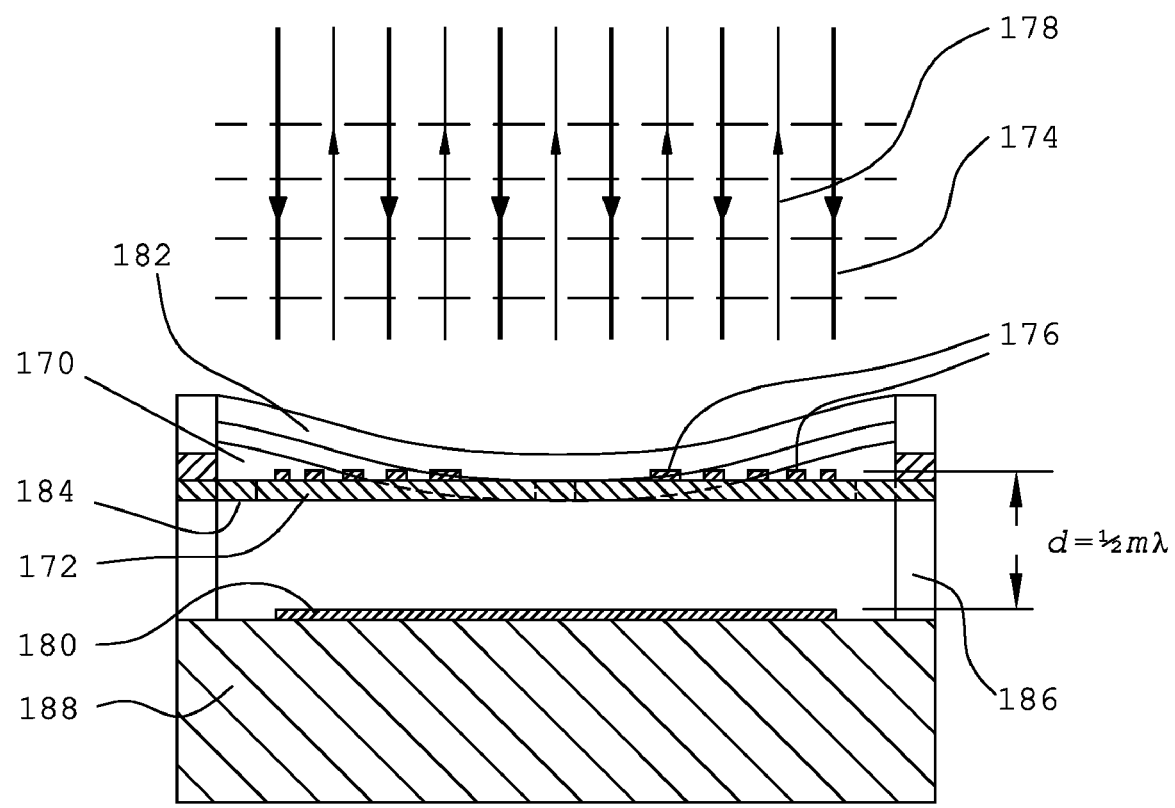
FIG. 5c is a cross-sectional view of the micromachined modulator shown in FIG. 4 when the first zone plate assembly is deflected downwards.

The operation of the preferred embodiment is as the following. The first zone plate assembly 170 is a movable plate assembly. When a voltage is applied between the two electrodes 172 and 180 of the parallel plate capacitor, an electrostatic force is exerted on the two plates. The force pulls down the first reflective zone plate assembly 170 by deforming the deformable resilient beams 182, as shown in FIG. 5c. The first reflective zone plate assembly itself remains substantially flat when it is deflected from its original position. The distance d between the surface of the reflective zones on the first reflective zone plate assembly 170 and the surface of the mirror 180 defines the separation between the two. When an incident wave illuminates the modulator in the normal direction, the path difference $\Delta P$ between the waves diffracted by the first reflective zone plate and the mirror is twice of their separation, $\Delta P=2d$. The amount of the deflection relates to the applied voltage. When the voltage is zero, the first reflective zone plate assembly 170 returns to its un-deflected position due to the returning force of the resilient beams 182.

As mentioned in previous discussion, the waves coming out of a reflective zone plate consist of both diffracted and reflected waves. It should be easy to see that if the distance d is zero, d=0, then the reflective zones from both zone plates of a pair of complementary zone plates make up a flat mirror. Therefore according to the theory of wave interference, in a first configuration where the path difference $\Delta P=m\lambda$, where m is an integer starting from zero, the modulator behaves like a mirror and reflects the incident wave back in the opposite direction 178 of the incident wave 174 as shown in FIG. 5c. At the same time, a destructive interference between the diffracted waves occurs resulting in zero intensity at the focal points of the zone plates. In a second configuration where the path difference $\Delta P=(m+\frac{1}{2})\lambda$, the modulator behaves like a phase zone plate. A constructive interference between the diffracted waves occurs, quadrupling the intensities at the focal points 189, as shown in FIG. 5b. At the same time, the waves reflected from the two zone plates are 180 degrees out of phase canceling out each other. At any other values of $\Delta P$, the output from the modulator is a mixture of diffracted and reflected waves. By changing the relative distance d, one can therefore modulates the intensity of either diffracted waves or the reflected waves, with the modulation being periodic in d. In practice, either the diffracted or reflected waves can be used to represent the information being modulated. An aperture is placed behind the modulator to separate the diffracted waves from the reflected waves. A very high contract ratio can be achieved by using an aperture with an appropriate numerical aperture value.

One of the great advantages of the present invention is that a full modulation is achieved with only a very small change of d, that is $\frac{1}{4}\lambda$ or 109 nm for an incident wave having a wavelength $\lambda=436$ nm. Therefore the modulator can be activated by using a much smaller force.

The distance between the first reflective zone plate assembly and the mirror can be changed by using many methods including motors, stepping motors, translators, and pushers. The distance can also be changed by applying a force to the movable zone plate assembly, where the force can be generated by effects including electrostatic, piezoelectric, magnetostrictive, electromagnetic, magnetic and thermal effects. The modulator can modulate any type of waves including electromagnetic waves (radio waves, visible light, infrared light, ultraviolet light, deep ultraviolet light, extreme ultraviolet light, and X-rays), acoustic waves, and matter waves. Even though, the preferred embodiment illustrated in FIG. 4 and FIG. 5 is exemplified with an optical wave and an electrostatic force, it should not be considered as limitations to the present invention.

There are two important parameters that characterize the performance of the zone plate modulator: a) the resonant frequency which determines how fast the modulator can respond to external force, and b) the activation voltage which sets the requirement of driver electronics. The basic theories describing the mechanical and electrical characteristics of the micro-electromechanical systems (MEMS) as these shown in FIG. 4 and FIG. 5 are provided in many textbooks, such as the book, *Microsystem Design*, edited by Stephone D. Senturia, Kluwer Academic Publishers, 2000.

As an example, consider a design of the preferred embodiment for a near ultraviolet (UV) application with $\lambda=436$ nm. Assume that the zone plates have a numerical aperture value of 0.5. The first reflective zone plate assembly is 50 $\mu$m×50 $\mu$m, and is made of 224 nm indium tin oxide (ITO). The reflective zones on the first reflective zone plate assembly are made of a layer of 50 nm thick of aluminum. The deformable resilient beams are made of 200 nm thick of silicon nitride with a tensile stress of 400 MPa, and are 50 $\mu$m long and 1.5 $\mu$m wide. Such a zone plate modulator is capable of producing a diffraction limited spot of 1.04 $\mu$m in diameter. The smallest zone width is about 500 nm, which can be readily fabricated using today's lithographic technologies. The design parameters can be easily adapted for different spot sizes.

Examine the resonant frequency first. The first reflective zone plate assembly and the deformable resilient beams form a spring-mass oscillator with an calculated spring constant of ~85 N/m. The estimated resonant frequency of such a mechanical system is about 4.5 MHz, which means that the response time of the system is less than 100 nanoseconds.

The activation voltage for achieving a full modulation depends on the initial distance d. In the example of FIG. 5, the first zone plate assembly is deflected by an electrostatic force, which is generated by a voltage source connected between the first zone plate assembly and the substrate. It is well known in the art that for a mechanical system comprising a parallel plate capacitor, there is an inherent instability if the system is voltage driven. When the deflection is within a $\frac{1}{3}$ of the initial distance d between the two plates, then the deflection is proportional to the applied voltage. However, if the deflection is more than $\frac{1}{3}$ of the initial distance, the deformable resilient beams collapse, and the top plate touches the bottom plate or the substrate. This phenomenon allows the preferred embodiment with electrostatic force activation to operate in two distinct modes, proportional mode and bi-state mode. In order to use a smaller activation voltage that can be provided by commonly used integrated circuits, the distance d should be as small as possible.

For a proportional mode zone plate modulator, the initial distance d can be set to one wavelength or 436 nm. Since a deflection of $\frac{1}{4}\lambda$ provides a full modulation, such a deflection is only $\frac{1}{4}$ of the initial distance, well within the limit of proportional operation. For a proportional mode zone plate modulator, the output of the modulator can be controlled continuously by a voltage source. The required activation voltage to achieve a full modulation for the example above is estimated to be less than 13 voltages.

For a bi-state mode zone plate modulator, the initial distance d can be set to 0.5 wavelength or 218 nm. The output of the modulator in this case is either ON or OFF. The activation voltage for a bi-state modulator for the example above is estimated to be less than 7 voltages. It has been shown that when the two micro-plates touch each other, they have the tendency to stick. Ridges can be made in the optically inactive regions on either of the plates on the side of surfaces facing each other to prevent the top plate from sticking to the bottom plate.

Figure 6A:
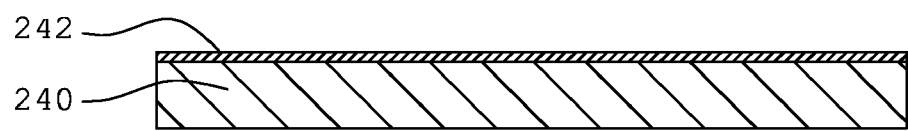
FIG. 6a–6k show the process flow of fabricating the zone plate modulator shown in FIG. 5.
Figure 6B:
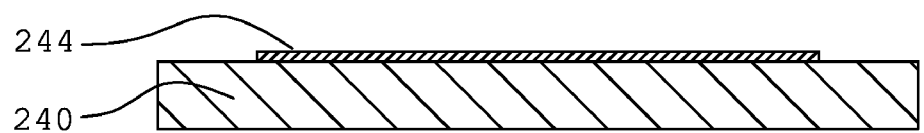
Figure 6C:
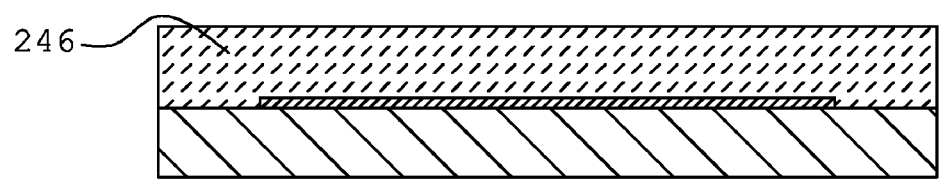
Figure 6D:
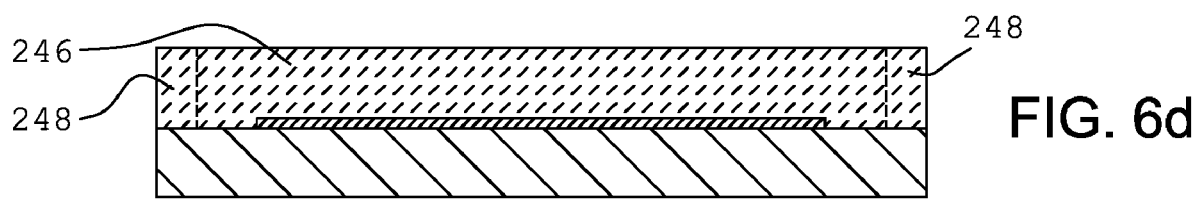
Figure 6E:
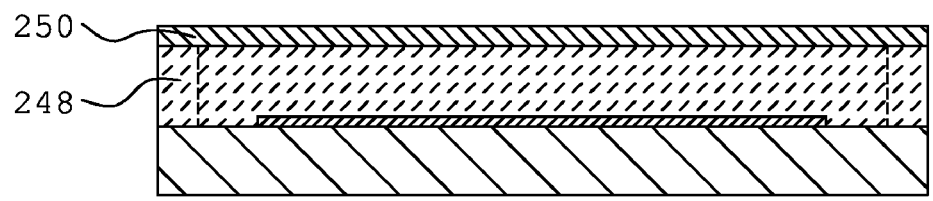
Figure 6F:
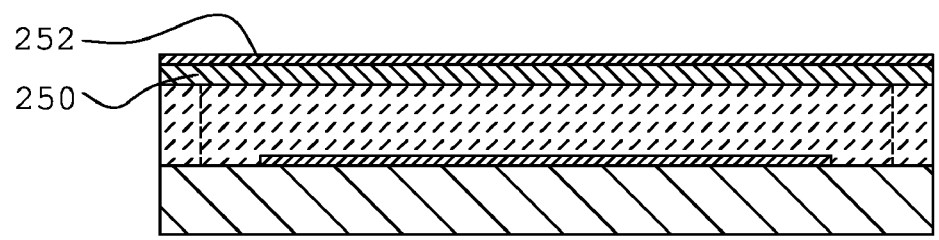
Figure 6G:
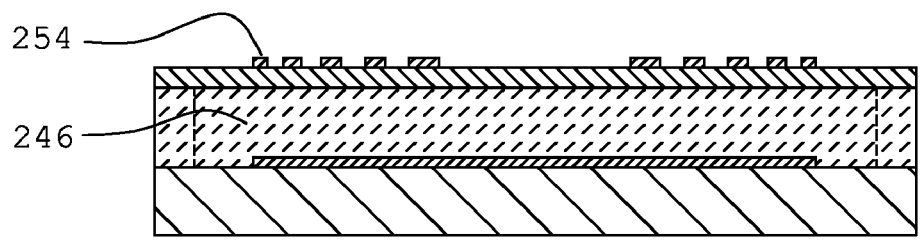
Figure 6H:
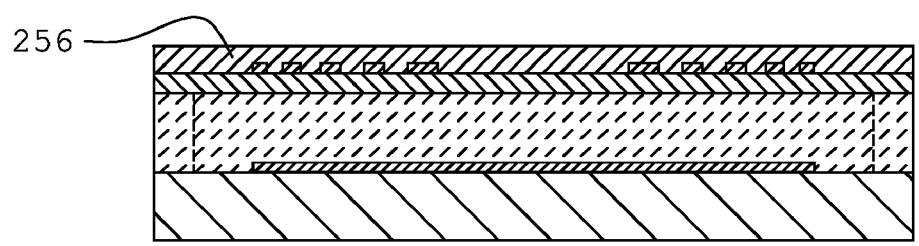
Figure 6I:
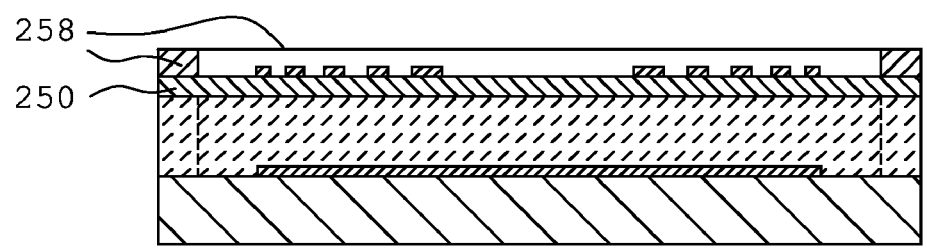
Figure 6J:
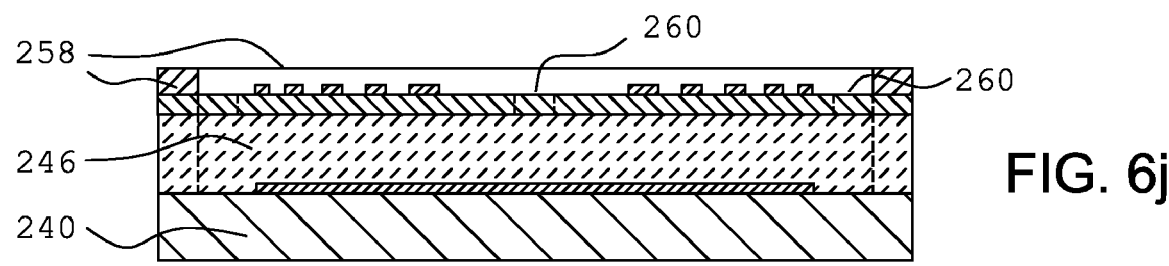
Figure 6K:
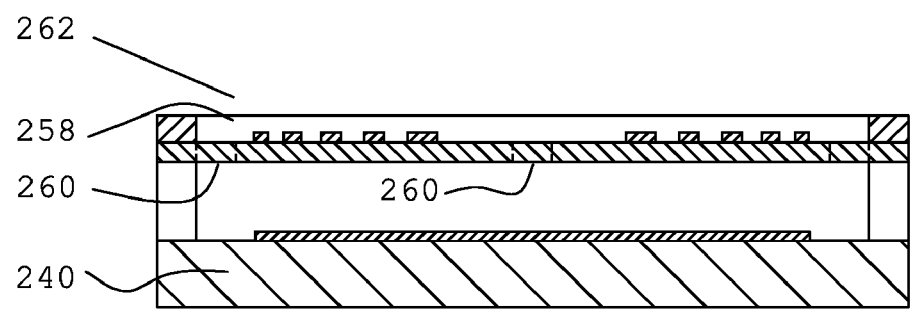

The fabrication process flow of the preferred embodiment is now shown in FIG. 6a–6k. The process starts with the deposition of a layer of 50 nm aluminum 242 on a silicon wafer 240. The first lithography and etching step defines the mirror 244 serving as the second reflective zone plate as shown in FIG. 6b. Then a layer of LPCVD polysilicon or amorphous silicon 246, 392 nm thick, is deposited as a sacrificial material and will be removed later. Other sacrificial materials such as oxides and polymers can also be used. The second lithography and etching step opens holes 248 on the sacrificial layer 246 as shown in FIG. 6d. This is followed by the depositions of a layer of 224 nm thick of ITO 250 and a layer of 50 nm thick of aluminum 252 as shown in FIG. 6e and FIG. 6f. These materials also fill in the holes 248 on the sacrificial layer 246 to serve as the supporting posts. Another lithography step delineates the reflective zones 254 on the first reflective zone plate assembly by etching the aluminum layer 252 as shown in FIG. 6g. After the reflective zones are patterned, a layer of 200 nm thick of silicon nitride 256 is deposited, and patterned to form the deformable resilient beams 258 as shown in FIG. 6i. The ITO layer 250 is then patterned to define the first zone plate assembly and linkages 260. The linkages 260 connect the first reflective zone plate assembly to the deformable resilient beams 258 as shown in FIG. 6j. The last step of the fabrication process is to remove the sacrificial layer 246 using Xenon Difluoride etch, resulting in the configuration illustrated in FIG. 6k. Now the first reflective zone plate assembly 262 is suspended above the substrate 240 by the deformable resilient beams 258 through linkages 260. Release holes (not shown) on the transparent regions of the first reflective zone plate assembly can be made to assist the removal of the sacrificial layer.

ADDITIONAL EMBODIMENTS

Figure 7A:
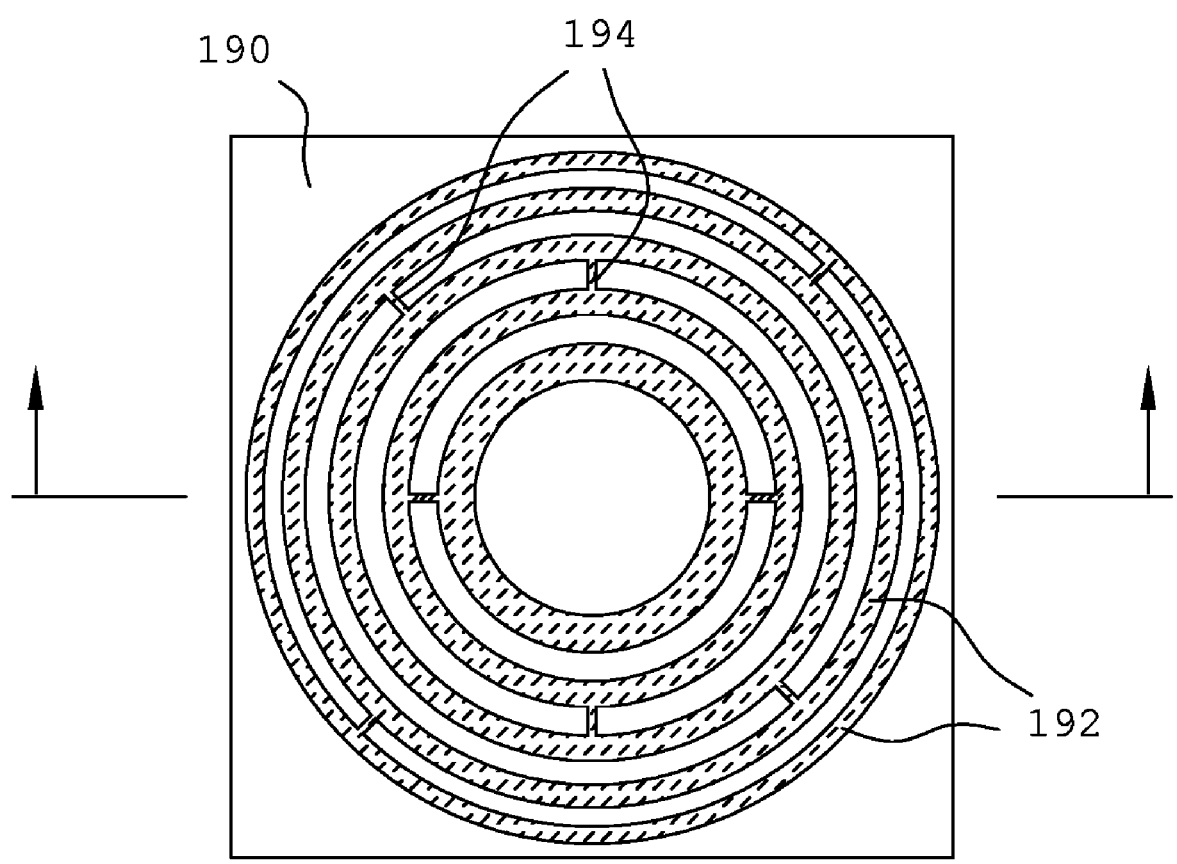
FIG. 7a–7b show the top view and cross-sectional view of an alternate construction method of the first zone plate assembly in one embodiment of the present invention.
Figure 7B:
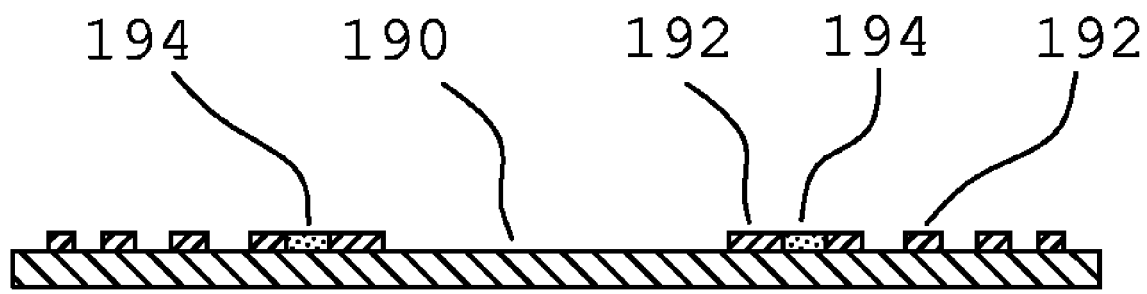

According to one embodiment of the present invention shown in FIG. 7a and 7b, the first zone plate assembly can also be made on a transparent insulating plate 190. In this case, the only function of the plate 190 is to provide a mechanical support for the metallic reflective zones 192. The metallic reflective zones 192 are inter-connected by bridges 194 to form a complete conductive layer serving as the electrode for applying the activation voltage. The plate 190 can be made of any transparent materials including glass, quartz, sapphire, various oxides, and various fluorides. The reflective zones 192 are made of reflective materials such as aluminum, gold or silver.

Figure 8A:
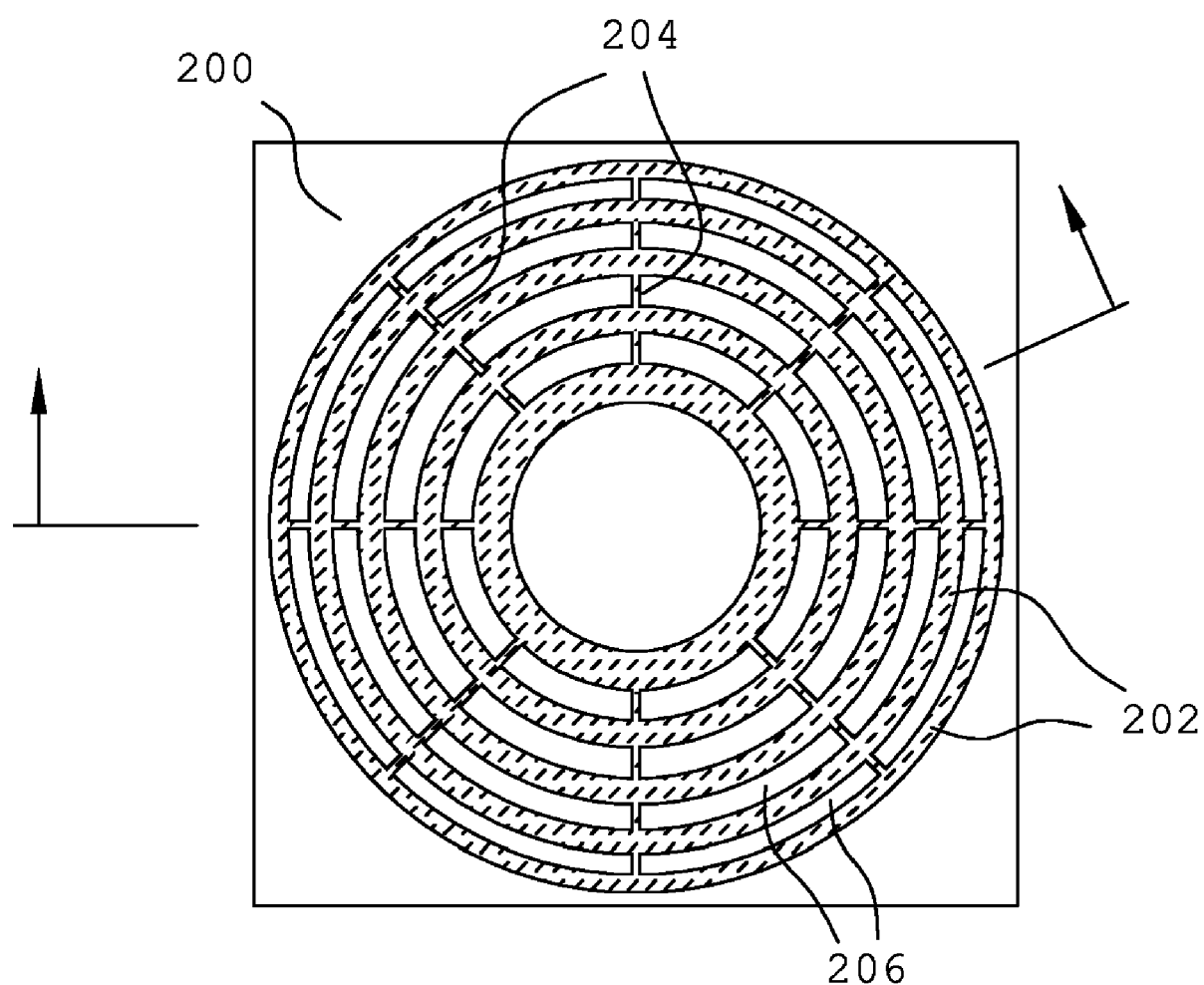
FIG. 8a–8b show the top view and cross-sectional view of an alternate construction method of the first zone plate assembly in another embodiment of the present invention.
Figure 8B:
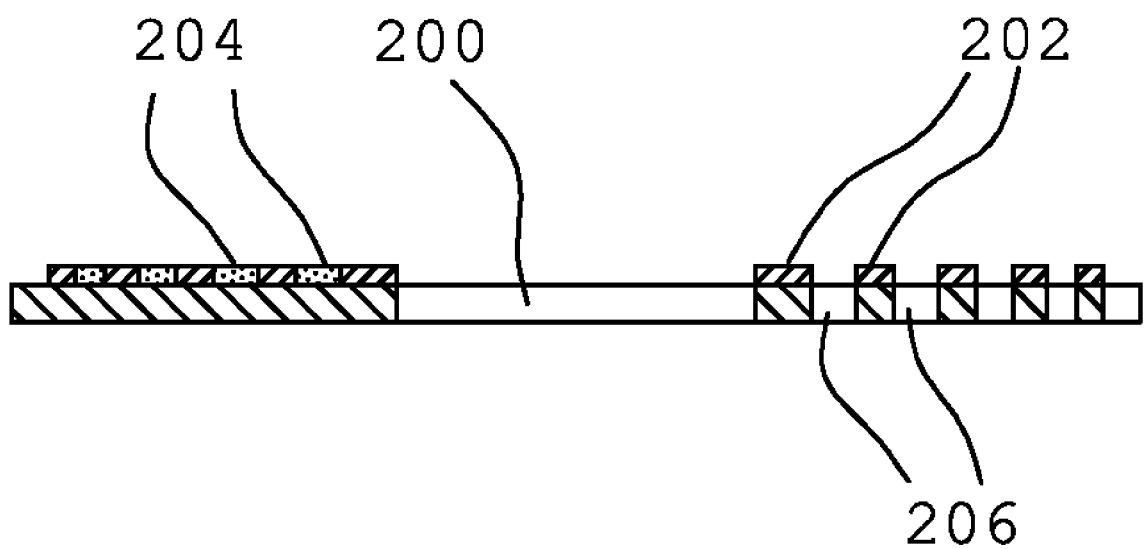

In another embodiment of the present invention, the first zone plate assembly can further be made using a nontransparent mechanical support plate 200 as shown in FIG. 8a and 8b. The regions 206 between the reflective zones 202 are removed to allow waves to pass through. The metallic reflective zones 202 are inter-connected by bridges 204 to form a complete conductive layer serving as the electrode for applying the activation voltage. The mechanical support plate 200 can be made of any convenient materials including silicon nitride, silicon oxides, sapphire, quartz, tungsten, and aluminum. The reflective zones 202 are made of reflective materials such as aluminum, gold or silver.

Figure 9:
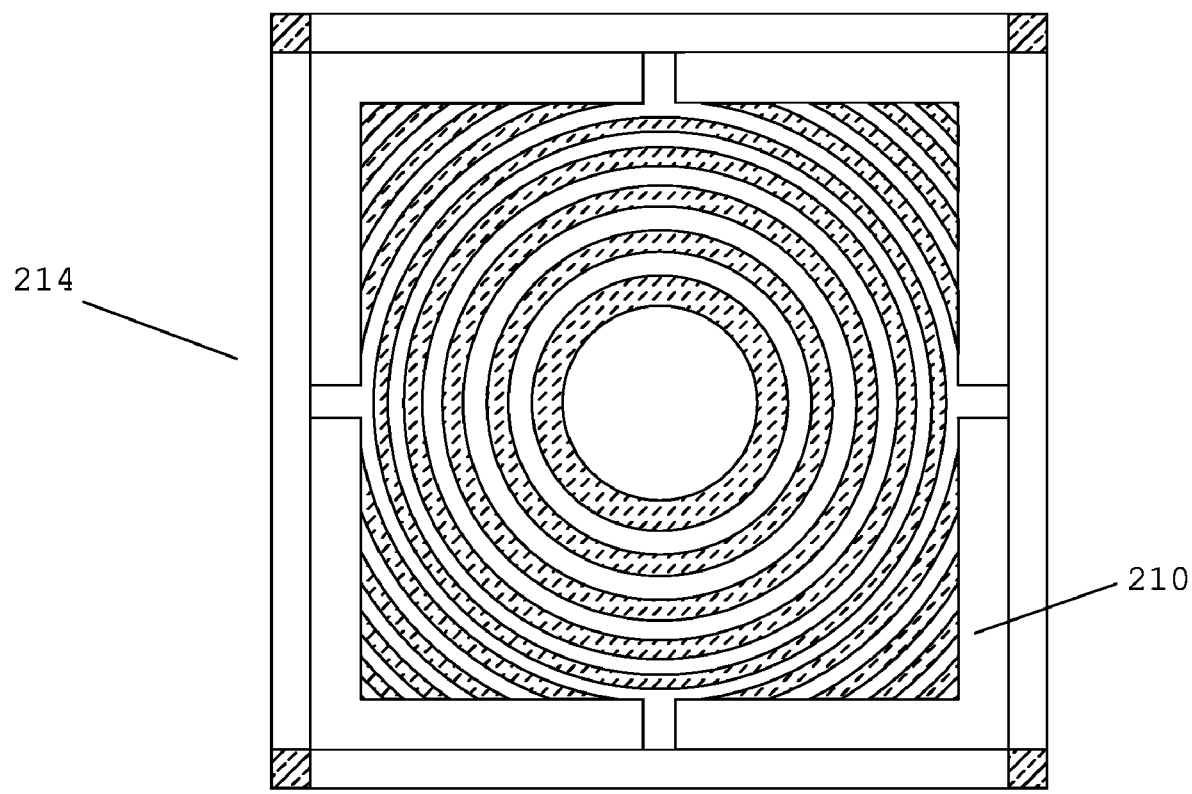
FIG. 9 shows the top view of the zone plate modulator according to the preferred embodiment with the zone plates having an aperture similar to the shape of the modulator.

In all of above illustrations, the zone plate modulators have a square shape. The active region of the reflective zone plates, however, is circular and is simply determined by the outer circle of the largest zone, which serves as a limiting aperture. The area ratio of the circle to the square defines the fill factor, which is a measure of how much of the surface area of a modulator can be used for modulating the incoming wave. Without considering the size of the deformable resilient beams, and the gaps between the reflective zone plates and the deformable resilient beams, the fill factor of previous examples is 78% due to the unused corners of the square modulators. It is desirable to increase the fill factor, therefore the optical efficiency, of the modulator. In one embodiment of the present invention, the aperture shape of the reflective zone plates is substantially similar to the shape of the modulator. As illustrated in FIG. 9, both the first reflective zone plate assembly 210 and the second reflective zone plate assembly (not shown) have a square aperture similar to the shape of the modulator 214, therefore increasing the fill factor to 100%. In other cases, a hexagon aperture can be used for a modulator having a shape of hexagon.

Figure 10:
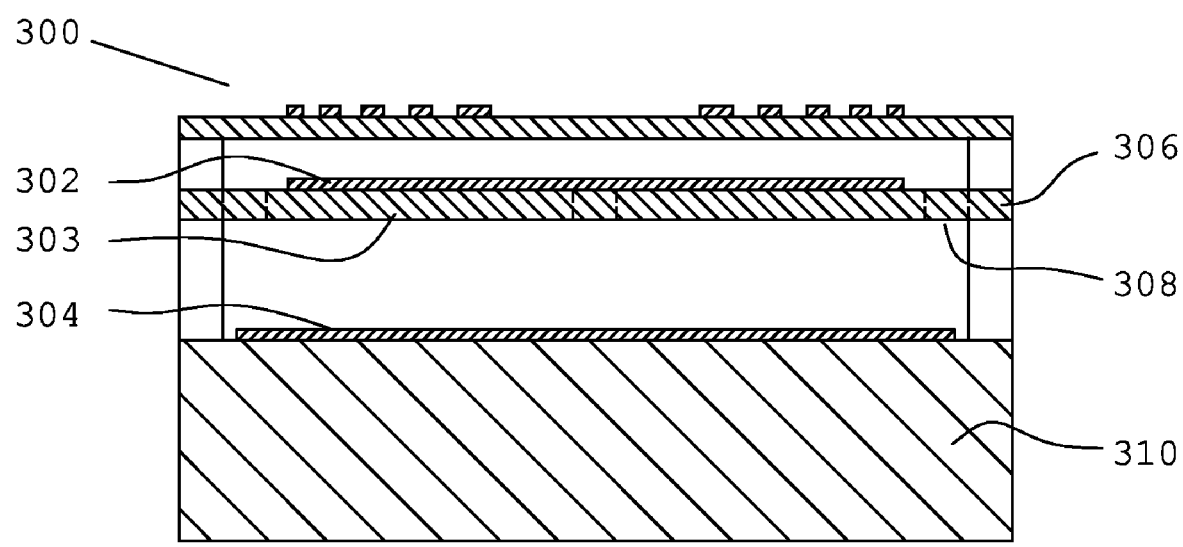
FIG. 10 shows another embodiment of the present invention having a stationary first zone plate assembly.

FIG. 10 shows another embodiment of the present invention. In the configuration of FIG. 10, the first reflective zone plate assembly 300 remains fixed. Instead, the second reflective zone plate assembly (shown as a mirror 302 on a supporting plate 303) is movable, and is controlled by the voltage applied between the mirror 302 and the electrode 304 on the substrate 310. The second reflective zone plate assembly is suspended above the substrate 310 by the deformable resilient beams 306 through linkages 308. This configuration has the advantage that the first reflective zone plate assembly is not part of the activation electrical circuit. Therefore, there is more freedom to select the materials used for the first reflective zone plate assembly.

Figure 11:
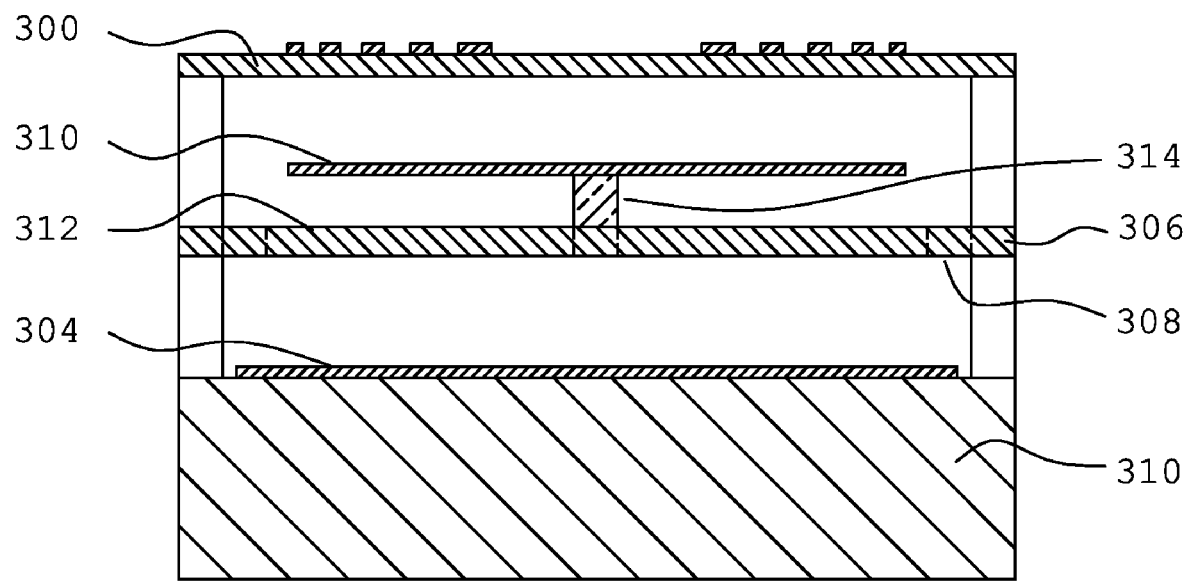
FIG. 11 shows another embodiment of the present invention having a stationary first zone plate assembly and with additional mechanical supports for the second zone plate assembly.

In another embodiment of the present invention as shown in FIG. 11, the second reflective zone plate assembly includes a dedicated optical layer 310 and a dedicated mechanical layer 312. The two layers are connected by a central post 314. The improvement provided by this embodiment is that the properties of the optical layer 310, such as flatness, is not affected by the mechanical layer at all, therefore ensuring maximum flexibility in design and modulator performance.

Figure 12:
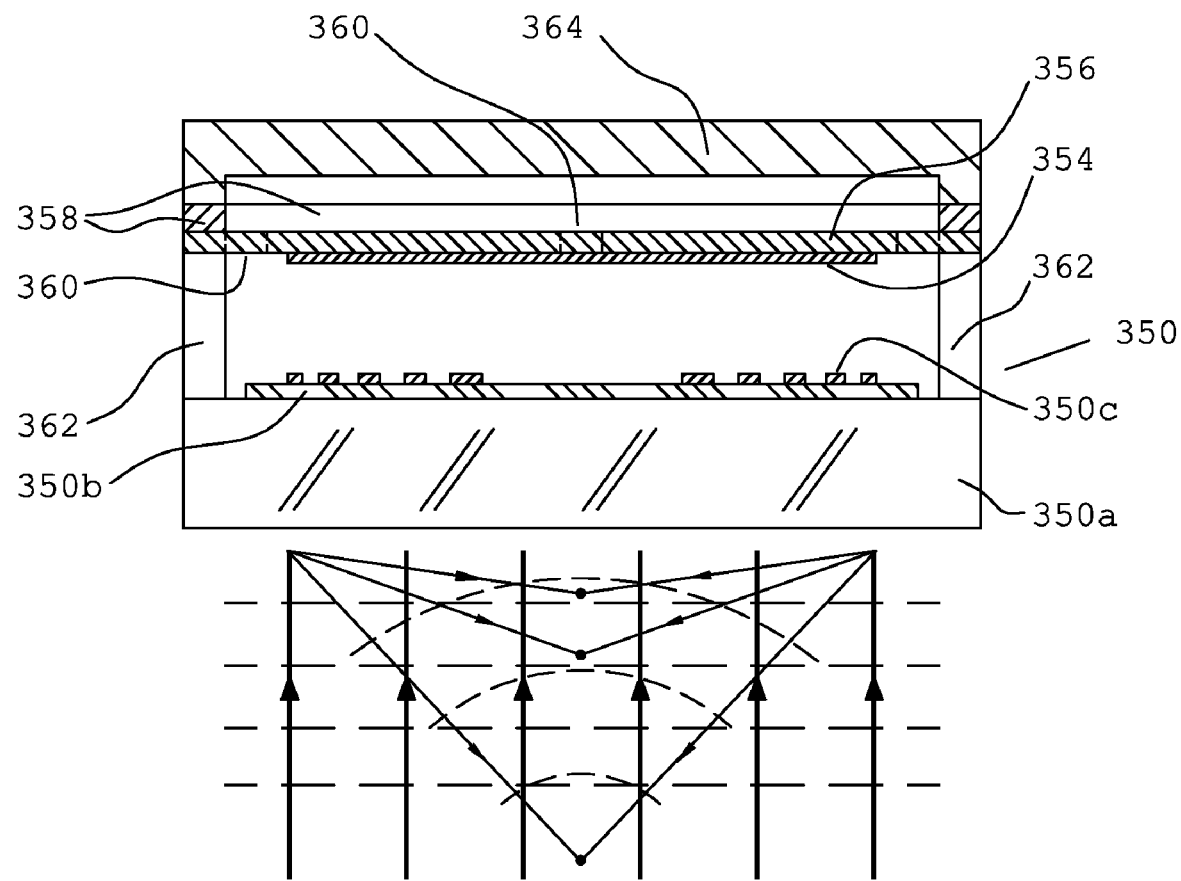
FIG. 12 shows another embodiment of the present invention using a transparent substrate and optionally a top cover structure.

Another embodiment of the present invention is shown in FIG. 12. The zone plate modulator receives and diffracts light waves from the substrate side. The substrate 350a is made of a transparent material. A layer of transparent conductive material 350b serves as the first electrode. Reflective zones 350c in conjunction with the substrate 350a and the transparent electrode 350b form the first reflective zone plate assembly 350. Alternatively, the transparent conductive layer 350b can be omitted. Instead, the metallic reflective zones 350c can be connected by bridges to form the first electrode, in a way similar to FIG. 7 and FIG. 8. A mirror 354 is suspended above the first reflective zone plate assembly 350 by a mechanical support layer 356. The mirror 354 and the support layer 356 serve as the second reflective zone plate assembly that is complementary to the first reflective zone plate assembly 350. The mirror also serves as the second electrode. The first electrode and the second electrode form a parallel plate capacitor for generating the electrostatic force to the second zone plate assembly. The support layer 356 is connected to deformable resilient beams 358 by linkages 360. The deformable resilient beams 358 are connected to the substrate 350a by posts 362. Optionally, a top cover 364 can be bonded or clamped onto the modulator. The top cover can also comprise a semiconductor die having the driving, processing and storage circuitry for controlling the operation of the modulator.

The operation of the zone plate modulator in FIG. 12 is similar to the operation of the preferred embodiment shown in FIG. 5. A voltage applied between the first electrode 350b and the second electrode 354 produces an electrostatic force, which pulls down the mirror 354 and the support layer 356, therefore changing the distance between the first and second reflective zone plate assemblies. The output light intensity, either reflected or diffracted, is then modulated accordingly.

Ramifications

When a beam of light passes through the transparent regions of the first reflective zone plate assembly as shown in FIG. 5b, there is a slight amount of reflection from both the front and back surfaces of the transparent plate 172 due to the mismatch of the refraction indices between air and the plate material. It is highly desirable to reduce the total reflection caused by the transparent plate. It is a well-known fact that there is a π phase shift between the two reflections from the two surfaces of a transparent plate. Therefore, the total reflection can be cancelled by destructive interference if the thickness t of the plate is chosen to be $$2tn_p = m\lambda$$

where $n_p$ is the index of refraction of the plate, and m is an integer. This is the condition of a single layer anti-reflection plate. In our previous example, for the purpose of reducing reflection, we have chosen the thickness of the ITO plate to be 224 nm for m=2, and $n_p$=1.95 for a wave having a wavelength λ=436 nm.

Figure 13:
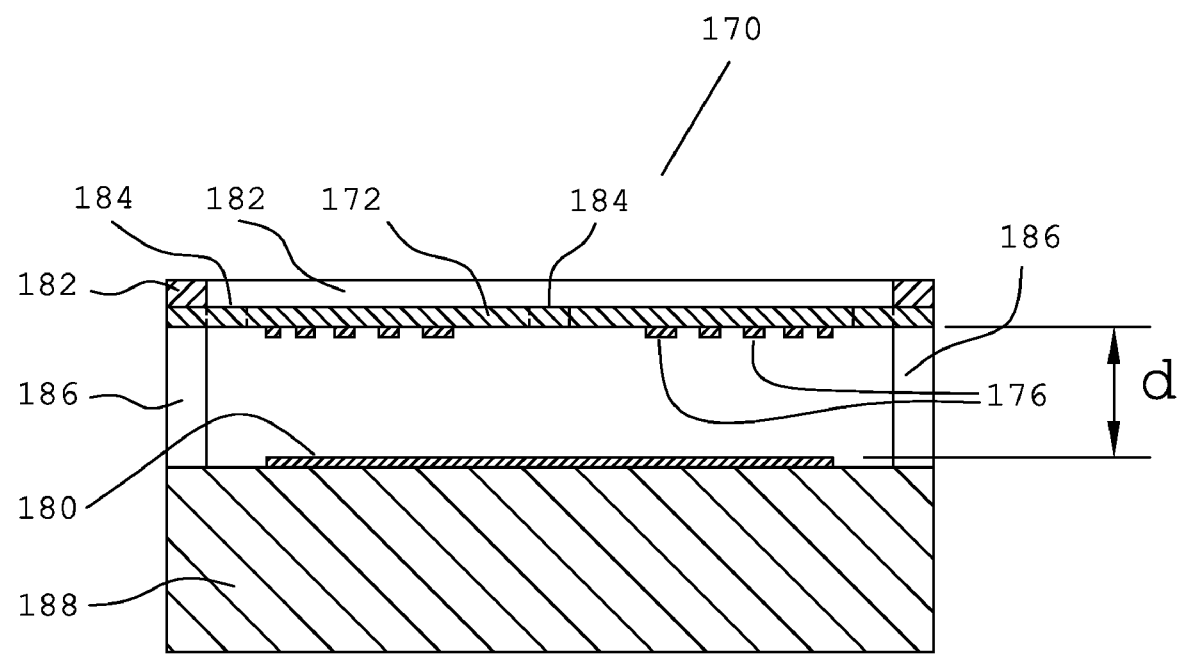
FIG. 13 shows an improvement of the zone plate modulator shown in FIG. 5.

It can also be seen from FIG. 5b that the light beams reflected by the mirror 180 pass twice though the transparent plate 172 of the first reflective zone plate assembly. Whereas, the light beams reflected directly off the zones 176 on the first reflective zone plate assembly never pass the plate. This difference creates an amplitude imbalance between the two groups of light beams if the transparent plate has losses. This effect can be eliminated by placing the reflective zones 176 on the underside surface of the transparent plate 172 as shown in FIG. 13. Therefore, both groups of light beams have identical amplitudes.

The exact number of deformable resilient beams and linkages should be determined by the design criteria of the desired mechanical properties. The positions of the linkages and the support posts can also be placed at difference locations along the deformable resilient beams to tailor the mechanical response of the modulator.

Usually a micromachined mechanical oscillator, such as the zone plate modulators of the present invention, exhibits many periods of oscillations when it is excited by a step function. This phenomenon is caused by the high Q-factor of this type of oscillators, and is undesirable for many applications. Two approaches can be used to prevent the oscillation. The first approach is to tailor the excitation signal at the driver circuit level so that the drive signal does not cause the oscillation. The other approach is to introduce mechanical dissipation to the modulator. This is well known in the art and is done by encapsulating the modulator in a gas environment at the packaging level. By properly selecting the type of gas and the gas pressure, the modulator can be properly damped.

For some applications, it is desirable to use a modulator that is capable of providing a gray level output. One of the advantages of the present invention is that it is very simple and flexible to produce a gray level output. Gray level output can be achieved either analogically or digitally using the present invention. A proportional mode modulator is naturally an analog device. Its output level is directly controlled by the applied voltage. Alternatively, the gray level effect (perceived by human eyes) can be achieved digitally using the zone plate modulator in either the proportional mode or the bi-state mode by taking advantage of the high operating speed of the modulator. In the proportional mode, the modulator is pulsed between the first and second configurations. In the bi-state mode, the modulator is pulsed between the ON and OFF state. In either case, the output brightness is changed proportionally by changing the pulse width. This technique is commonly referred to as pulse width modulation (PWM). For example, a standard TV display has a frame rate of 30 frames per second with each frame being 33 ms long. Therefore, an ON state pulse of 16.5 ms=0.5*33 ms corresponds to the mid-level gray output. A further improvement is to use a number of short pulses to replace one long pulse of the PWM method, and to spread out the short pulses evenly throughout a frame time. By changing the number of short pulses, the output brightness is changed proportionally. Again for a standard TV application, a frame time of 33 ms is divided into 256 units. Each unit is a pulse having a pulse width tp=129 μs. Assume that an ON pulse is represented by "1", and an OFF pulse is represented by "0". Therefore a pattern of "1111 . . . 11" produces a gray level of 256, and a pattern of "1010 . . . 10" generates the mid-gray level of 128. A dark frame is produced by the pattern of "0000 . . . 00". Since the ON pulses are distributed evenly throughout the frame time, this method produces a visually smoother image than the PWM method.

The substrate 188 in FIG. 5 can be made of any convenient materials including any of the semiconductors such as silicon, silicon-on-insulator wafers (SOI) and germanium, compound semiconductors including silicon-germanium (SiGe), silicon carbide (SiC), gallium-arsenide (GaAs). It can also be a semiconductor die having electronic driver circuitry, processing circuitry, and storage.

The substrate can also be transparent materials including silicon oxide (quartz, fused quartz, and fused Silica), aluminum oxide (Sapphire), Barium Fluoride (BaF2), Calcium Fluoride (CaF2) Lithium Fluoride (LiF), Magnesium Fluoride (MgF2), and various type of glasses.

Suitable materials for the transparent conductive plate 172 in FIG. 5 includes various type of doped indium oxides (In2O3:Sn), tin-oxides (SnO2:Sb, SnO2:F), zinc oxides (ZnO:Al, ZnO:Ca, ZnO:In), and cadmium oxide(CdO:Sn, CdO:In).

Materials appropriate for the deformable resilient beams include metals (aluminum, tungsten, titanium, molybdenum, etc.), semiconductors (silicon, polysilicon, silicon carbide, etc.), various nitride (silicon nitride, aluminum nitride, etc.), and oxides (silicon oxide, aluminum oxide, etc.). Multi-layers of these materials can also be used to tailor the material properties such as stress.

The reflective materials for the reflective zones 176 and the mirror 180 in FIG. 5 can be a layer of any materials that have a high reflectance to the incident wave. Aluminum or silver can be used for visible range, all the way down to mid UV. Materials such as gold, silver, and copper can be used from visible to infrared. The reflectance of these single layer metals can be enhanced by adding a multiple dielectric coatings such as various fluorides (magnesium fluoride, lithium fluoride, calcium fluoride), or silicon carbide. The multiple dielectric coating on aluminum can extend the usable range into deep UV. The reflective materials can also be made of alternating multilayers of dissimilar materials (high reflectivity and low reflectivity, high z and low z) for shorter wavelength such as extreme ultraviolet (EUV) light or X-rays. The thickness of each layer in the alternating multilayer materials is such that the light reflected from each layer interferes constructively. For example, multilayers of alternating films of silicon and molybdenum can be used for EUV light.

Materials suitable for the transparent substrate in FIG. 12 includes silicon oxide (quartz, fused quartz, and fused Silica), aluminum oxide (Sapphire), barium fluoride (BaF2), calcium fluoride (CaF2), lithium fluoride (LiF), magnesium fluoride (MgF2), and various type of glasses.

Conclusions

Present invention provides many technological advancements to prior art. In particular, the zone plate modulator in the present invention is a single and compact integrated device performing both the modulating and focusing functions, therefore greatly reducing the size, weight, and cost of optical systems. The zone plate modulator also eliminates the aligning optics as required in conventional technology, making the modulator substantially less susceptible to the influence of environmental factors. Other advantages include very short mechanical response time, and low activation voltage requirement. Owing to the symmetrical design of the zones, zone plate modulators are polarization independent in nature. Another advantage of the present invention is that the modulator can be micromachined using CMOS compatible fabrication process. Therefore, it can be manufactured on large scale, significantly reducing the unit cost.

II. Arrays of Zone Plate Modulators

Another embodiment of the present invention is an array of zone plate modulator elements. Each zone plate modulator element in the array is one of the embodiments of the zone plate modulators in Section I, and can be individually controlled independent of other elements in the array. As discussed previously, a zone plate modulator is capable of focusing an incoming wave into a spot. Therefore such an array of zone plate modulator elements constitutes a compact and high performance spot array generator.

Figure 14A:
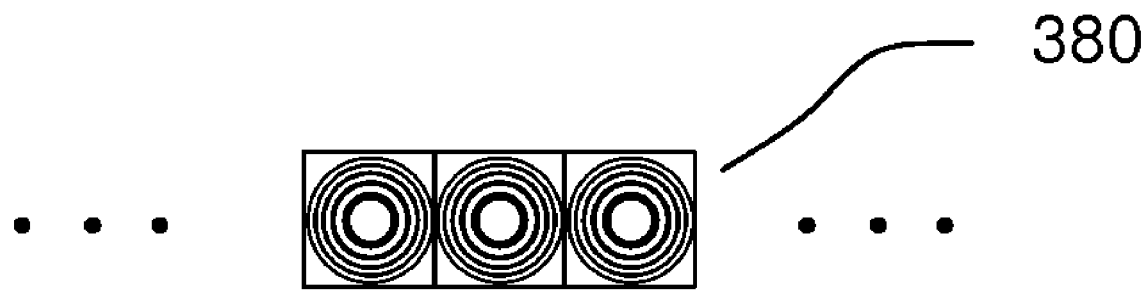
FIG. 14a–14b show a one-dimensional array of zone plate modulators and the spot array generated by the array in another embodiment of the present invention.
Figure 14B:
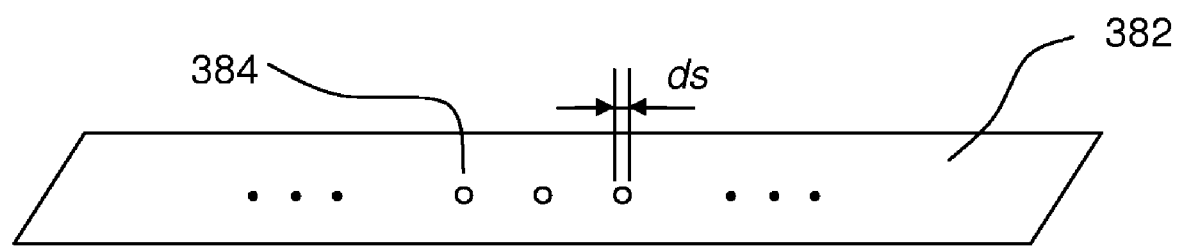
Figure 15A:
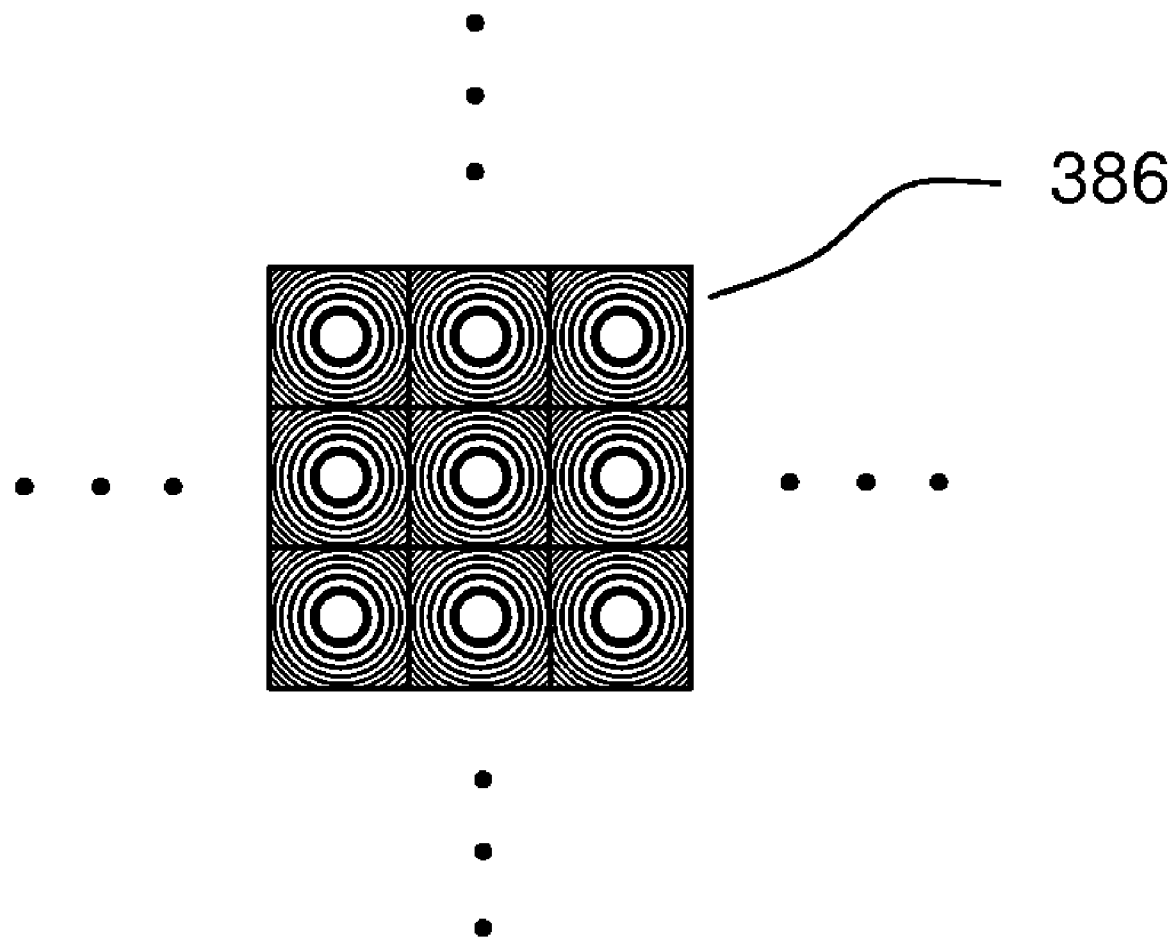
FIG. 15a–15b show a two-dimensional array of zone plate modulators and the spot array generated by the array in another embodiment of the present invention.
Figure 15B:
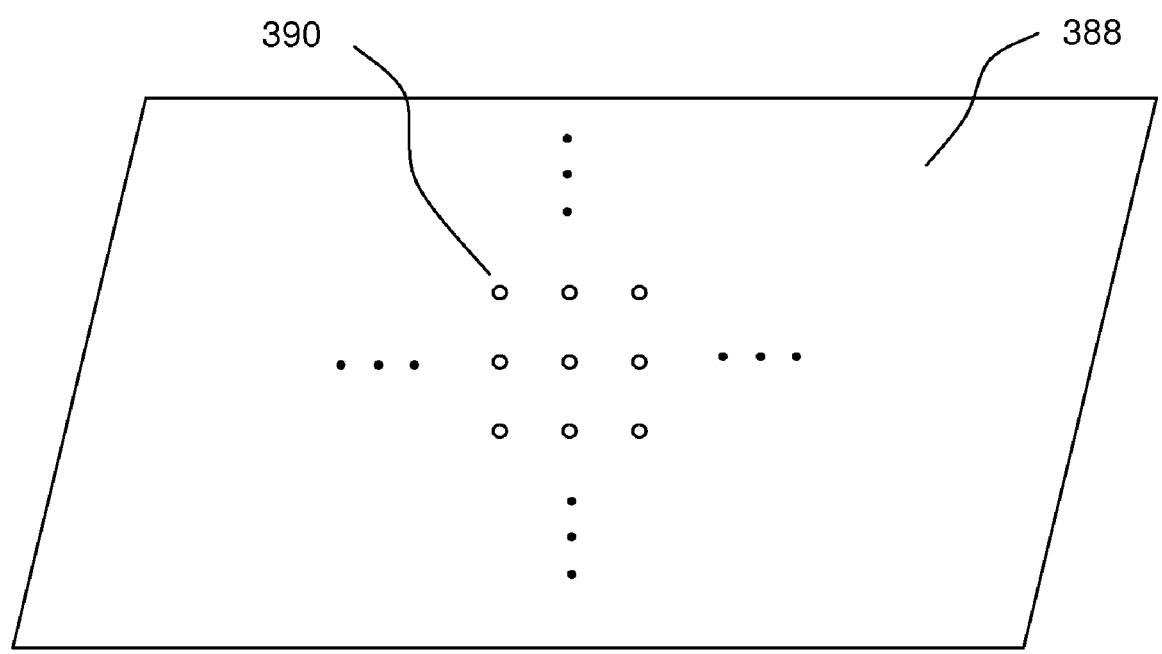
Figure 16A:
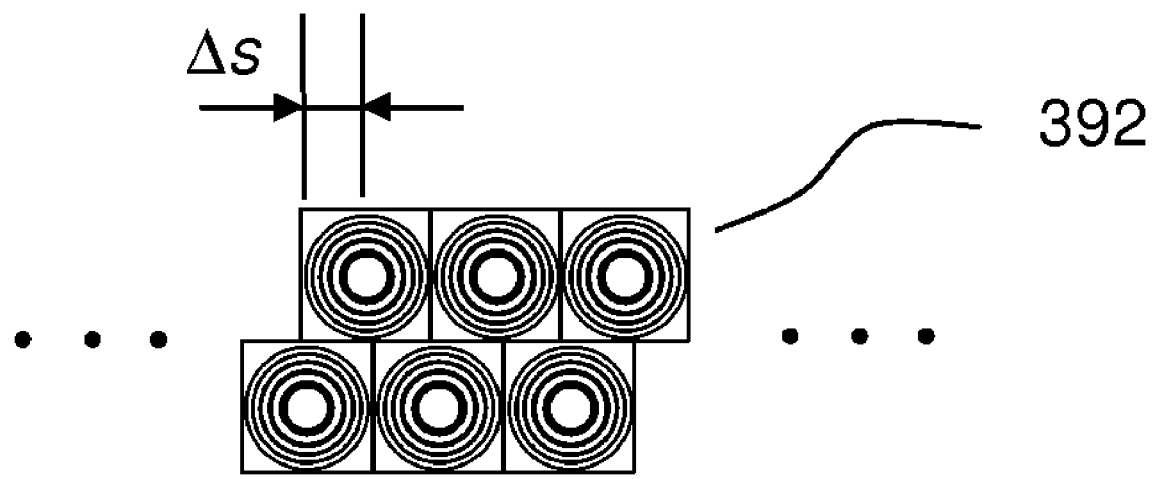
FIG. 16a–16b show a two-dimensional staggered array of zone plate modulators, the spot array generated by the array, and the projection of the spot array in another embodiment of the present invention.
Figure 16B:
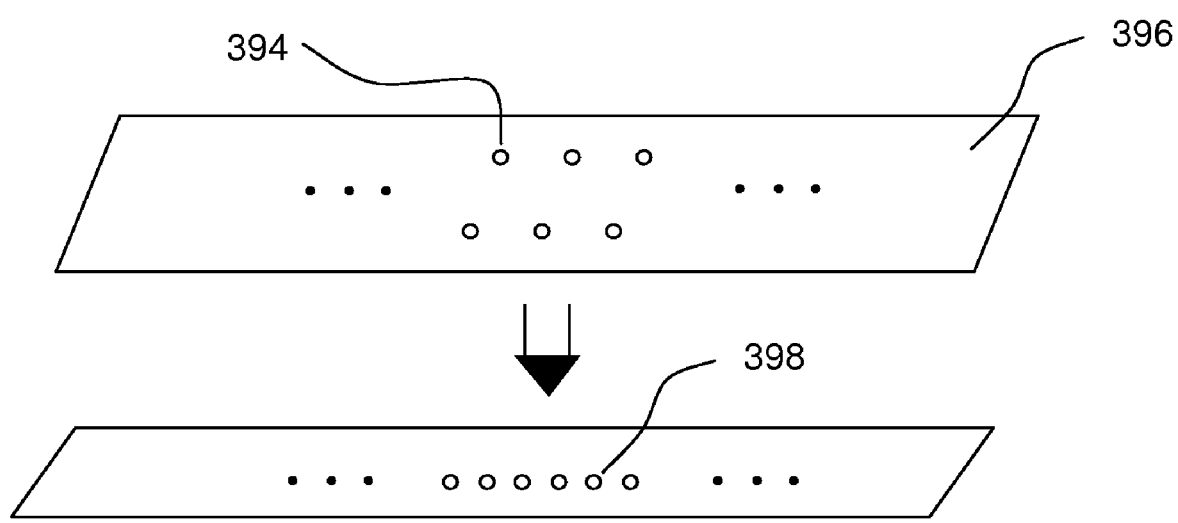

The array of zone plate modulator elements can be a one-dimensional array 380 as shown in FIG. 14a. On the focal plane 382 of the array, a one-dimensional spot array 384 is formed as shown in FIG. 14b. The spot size ds is determined by the design parameter of the modulator elements and can be diffraction limited. The array of zone plate modulator elements can also be a two-dimensional array 386 as shown in FIG. 15a with its image 390 formed on the focal plane 388 of the array as shown in FIG. 15b. The individual elements of the array in FIG. 15a are also illustrated with having a square aperture. In both one-dimensional or two-dimensional arrays illustrated above, the spacing between the spots in the spot array is the same as the spacing between the modulator elements of the array. A much higher density one-dimensional spot array can be generated by using a staggered two-dimensional array of zone plate modulator elements 392 as shown in FIG. 16a. Each row in a staggered two-dimensional array is shifted horizontally by an amount of □s. Looking into the direction normal to the rows of the spot array 394 in FIG. 16b, one sees a much denser one-dimensional spot array 398. If the shift distance □s equals to the spot size ds, then a connected one-dimensional spot array is form.

Two-dimensional images can be formed by using any of these array forms of zone plate modulator elements. For example, coupled with a mechanical scanning of the imaging surface in the direction normal to the array, a two-dimensional image can be generated on an imaging surface using a one-dimensional array or a staggered two-dimensional array of zone plate modulator elements. The apertures of each modulator elements in an array can be circular or can be chosen to be similar to the shape of each modulator elements to achieve a high fill factor. For example, an array of two-dimensional zone plate modulator elements with each modulator positioned on a square grid, the aperture is preferably a square one as illustrated in FIG. 15.

Figure 1:
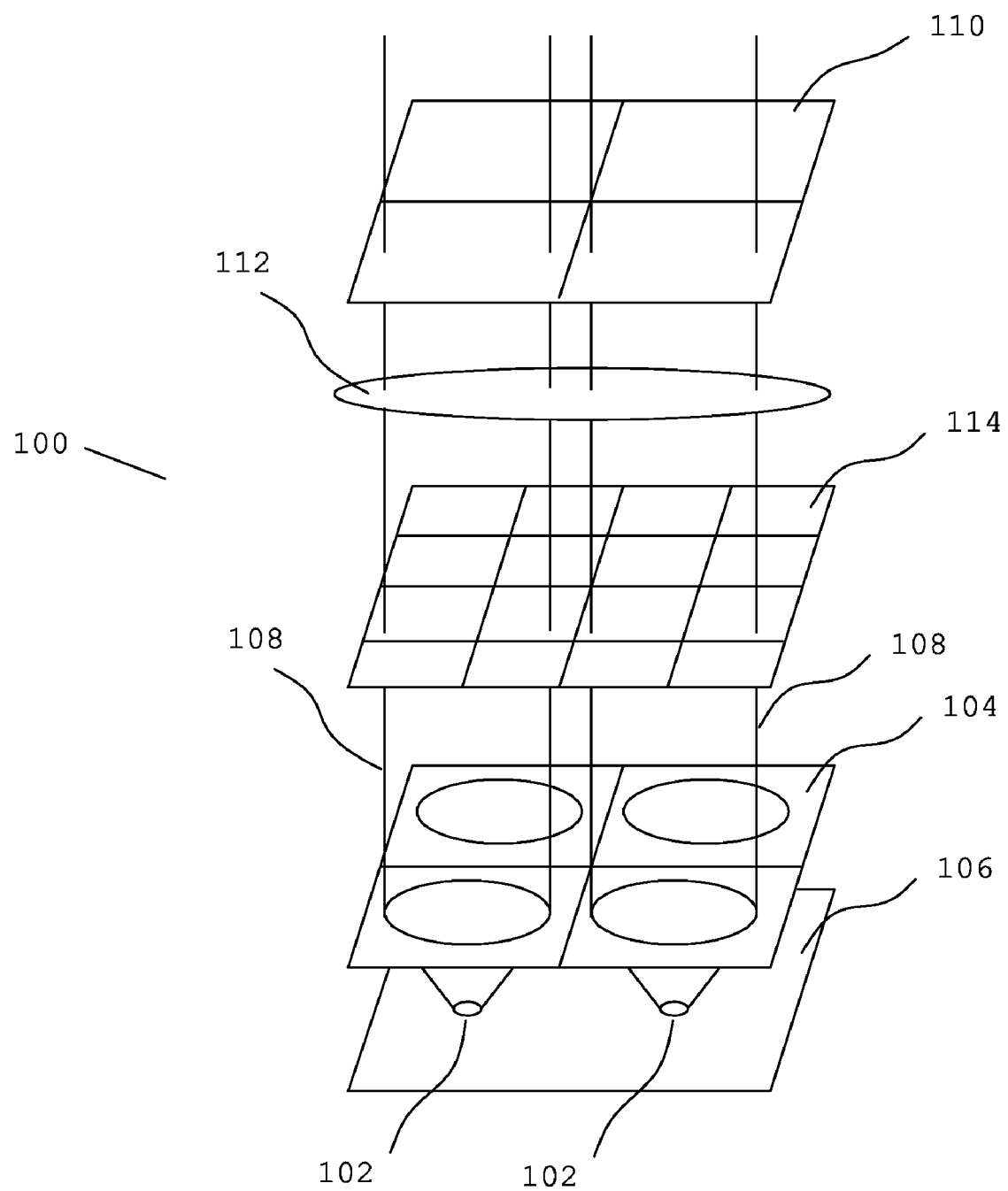
FIG. 1 shows a schematic representation of a typical spot array generating system in prior art.
Figure 2:
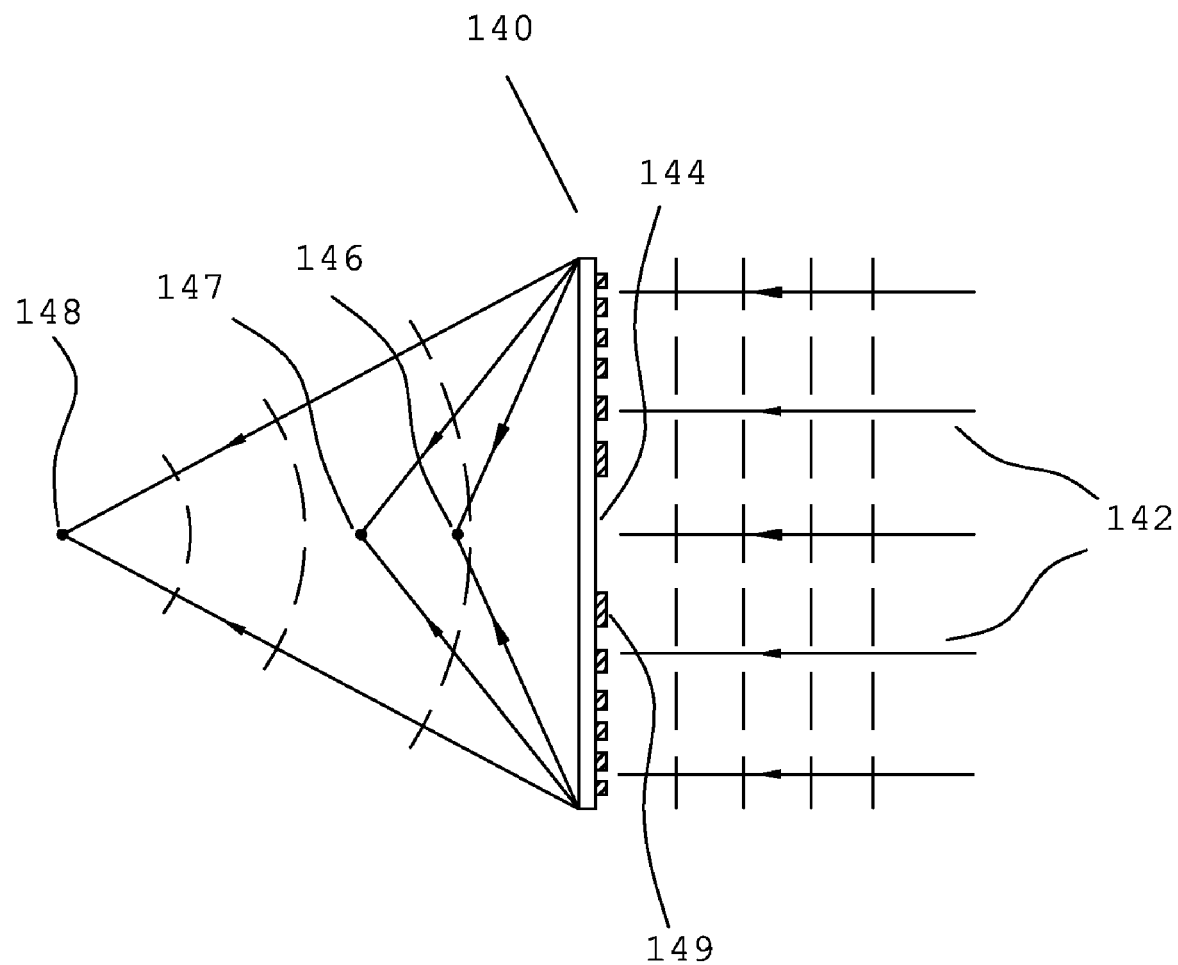
FIG. 2 shows a typical conventional zone plate in prior art.

The embodiment of the present invention provides many advantages. For example, an array of zone plate modulators can be used as a compact spot array generator, replacing the complex and bulky systems of the conventional technology as shown in FIG. 1. In addition, the present invention also greatly improves reliability and efficiency, and lowers the cost over the conventional technology.

III. Achromatic Zone Plate Modulators

The optical properties of the zone plate modulators described so far depend on the wavelength of the incident wave. For a zone plate modulator designed for C-band ($\lambda$=1525 nm~1562 nm) applications, the output intensity varies by as much as 3 dB across the band at an attenuation of −40 dB. For certain applications such as variable optical attenuators (VOA), it is highly desirable to have a wavelength independent modulation/attenuation. Godil et al. (*Achromatic optical modulator*, U.S. Pat. No. 6,169,624, issued on Jan. 2, 2001) described a method of compensating the wavelength dependence for optical attenuators that operate based on the principle of light beam interference.

Figure 17A:
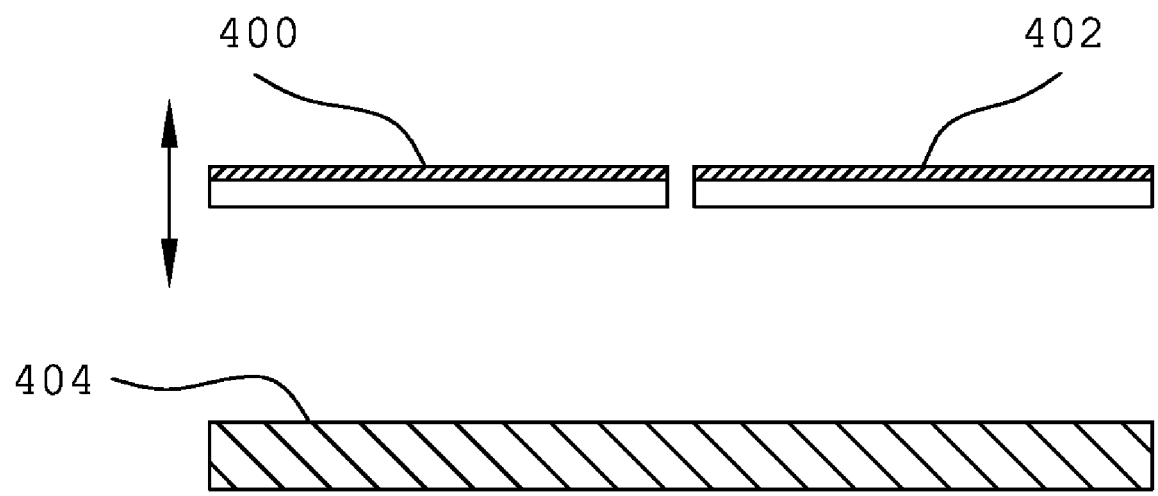
FIG. 17a shows a schematic of a wavelength dependent modulator in prior art.
Figure 17B:
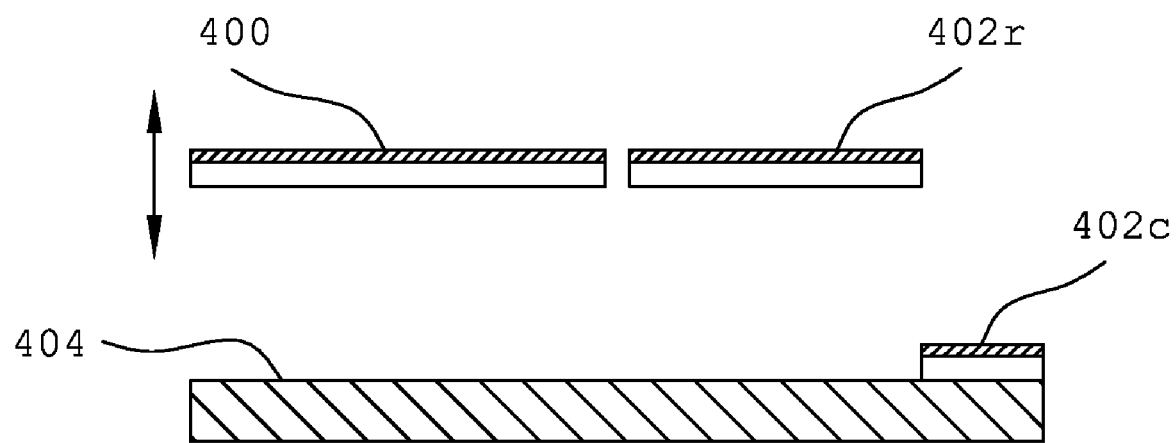
FIG. 17b shows a schematic of a wavelength independent modulator in prior art.

According to prior art, a typical modulator as illustrated in FIG. 17a consists of a first reflective surface 400 and a second reflective surface 402 having equal amplitude E1=E2=E0. The two surfaces are suspended above a substrate 404. The idea of compensating the wavelength dependence described by Godil et al. (*Achromatic optical modulator*, U.S. Pat. No. 6,169,624, issued on Jan. 2, 2001) is to split one of the two surfaces, say the second reflective surface 402 as shown in FIG. 17a, into a reference surface 402r and a compensating surface 402c having an amplitude E2r and E2c respectively as shown in FIG. 17b. In the un-deflected configuration, surfaces 400 and 402r are co-planar, and are suspended above the compensating surface 402c by a distance Da=(N$\lambda$)/2, where N is an integer and $\lambda$ is the center wavelength of the incident wave. To achieve an achromatic or wavelength independent attenuation, the amplitude of E2c is set to equal to E2c=E1/(2N). Therefore, the achromatic performance of the attenuator is determined by a single parameter Da.

Figure 18:
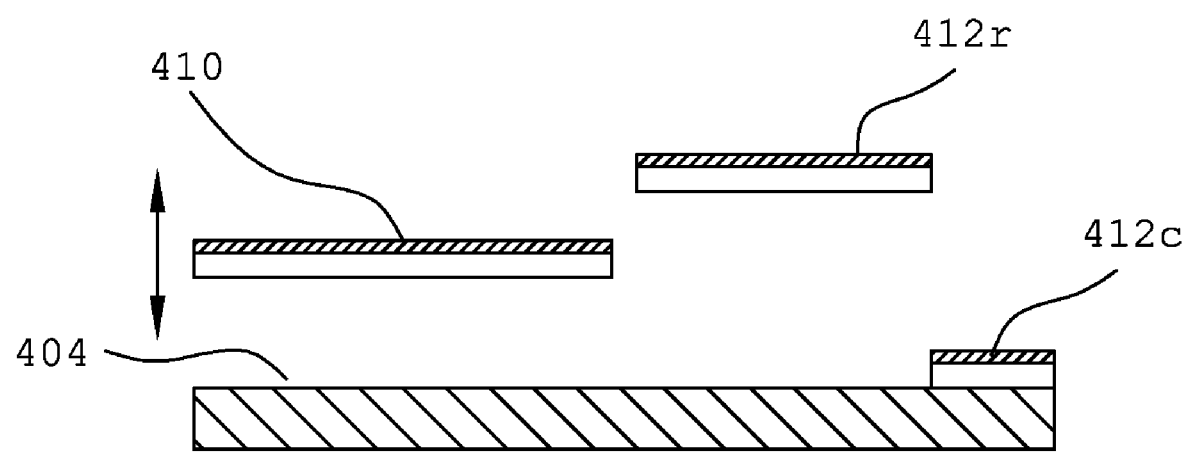
FIG. 18 shows the arrangement of reflective surfaces of an achromatic zone plate modulator according to one embodiment of the present invention.
Figure 19:
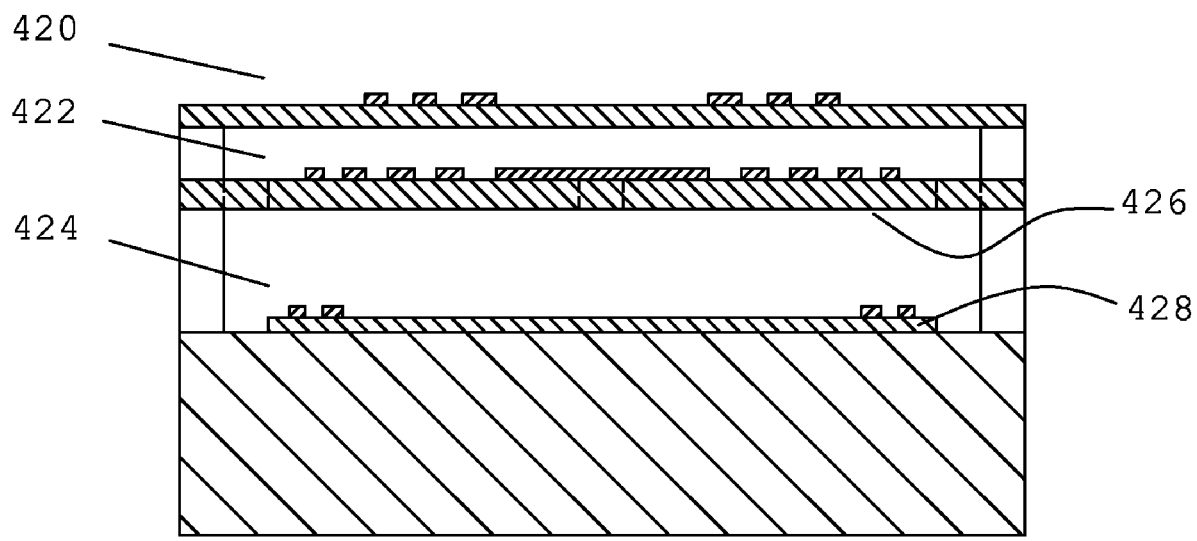
FIG. 19 shows the structure of an achromatic zone plate modulator in another embodiment of the present invention.

One embodiment of the present invention is an achromatic zone plate modulator. As shown in FIG. 18, the embodiment provides an improvement to prior art, and includes a second parameter Dz. The first surface 410 has a reflective surface area Ed and can be deflected by an applied force. The reference surface 412r has a reflective surface area Er. The compensating surface 412c has a reflective surface area Ec. The first surface 410 is positioned below the reference surface 412r by a distance Dd≅(M$\lambda$)/2 in the un-deflected configuration, where M is an integer. The compensating surface 412c is positioned below the reference surface 412r by a distance Dc≅(N$\lambda$)/2, where N is also an integer. In this discussion, we assume that the amplitude of the light reflected by a surface is proportional to the surface area. To achieve an achromatic modulation/attenuation, the amplitude of the compensating surface Ec is determined by Ec≅(2M+1)Ed/(2N), with Er≅Ed−Ec. FIG. 19 demonstrates the device structure of an achromatic zone plate modulator according to one embodiment of the present invention. The achromatic zone plate modulator includes a fixed reference reflective zone plate assembly 420, a deflectable reflective zone plate assembly 422, and a fixed compensating reflective zone plate assembly 424. Both the reference reflective zone plate assembly 420 and the compensating reflective zone plate assembly 424 are partial zone plates. Together, they form a complete reflective zone plate that is complementary to the deflectable reflective zone plate assembly 422. These partial zone plates are made of pre-determined number of circular zones as shown in FIG. 19 according to the design equations. The partial zone plates can also be made of pre-determined amount of fractions, such as arc sections, of the circular zones. The compensating reflective zone plate assembly 424 can be also replaced with a mirror assembly. The first electrode 426 and the second electrode 428 form a parallel plate capacitor. A voltage applied to the parallel plate capacitor deflects the deflectable reflective zone plate assembly 422. A complete extinction of reflected light is achieved when the deflection reaches ¼λ. During the above discussion, the approximately equal sign "≅" has been used to indicate that the optimized parameters may be slightly away from the values given by the right hand side of the design equations, as illustrated in a particular example below.

Figure 20:
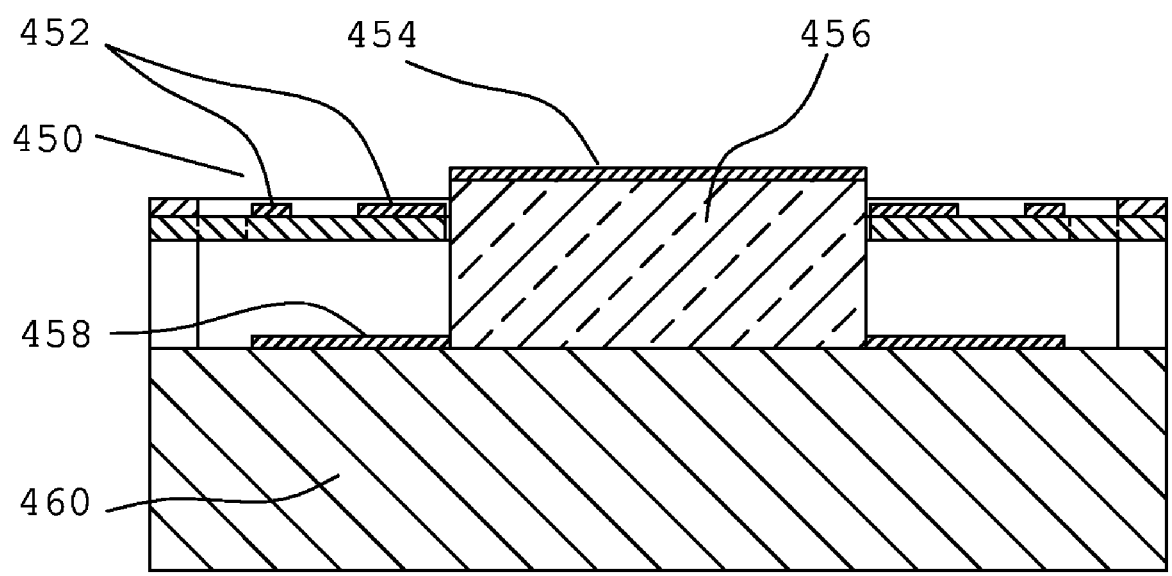
FIG. 20 shows a particular case of the achromatic zone plate modulator shown in FIG. 19.
Figure 21:
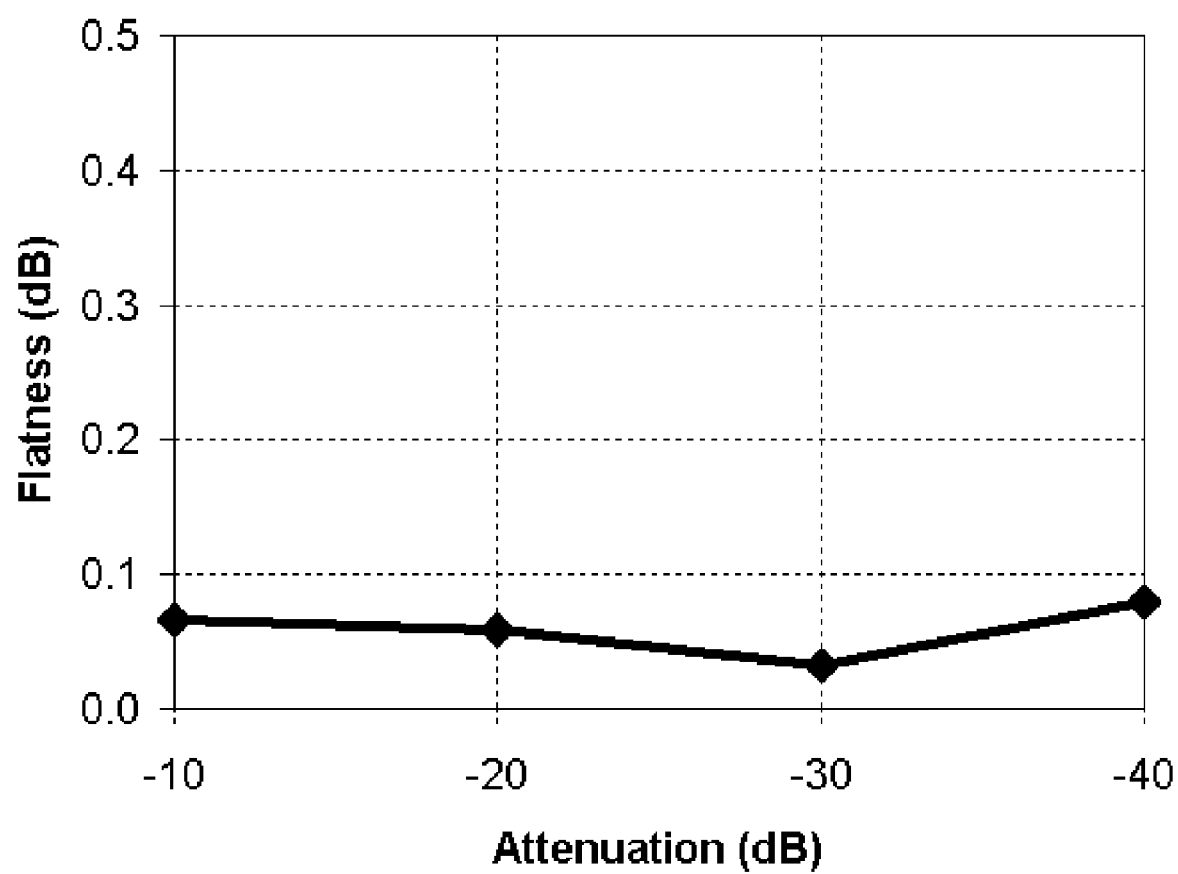
FIG. 21 shows the calculated attenuation flatness curve as a function of the attenuation for the achromatic zone plate modulator shown in FIG. 20.

In particular, an achromatic zone plate modulator that has a simplified device structure is shown in FIG. 20. The modulator is designed with Ec/Ed≅0.5, Dd≅0.5λ, and Dc≅1.5λ, which corresponds to the case of M=1 and N=3. The deflectable reflective zone plate assembly 450 includes two even zones 452. The complementary reflective zone plate assemblies comprise of a reflective surface 454 on the central island 456 serving as the reference zone plate assembly, and a mirror 458 on the substrate 460 serving as the compensating zone plate assembly. In the un-deflected state, the surface of the deflectable reflective zone plate assembly 450 is approximately 0.5λ below the reference surface 454 on the central island 456. In turn the mirror 458 is approximately 1.5λ below the reference surface 454. When a voltage is applied between the deflectable reflective zone plate assembly 450 and the substrate 460, the downward deflection of the deflectable reflective zone plate assembly modulates the incident light wave achromatically. The calculated attenuation performance of the modulator is shown in FIG. 21 for C-band applications with Ec/Ed=0.491, Dd=0.497λ, and Dc=1.523λ, where λ=1544 nm. The largest across the band attenuation variation (attenuation flatness) is less than 0.1 dB for attenuation settings ranging from 0 dB to −40 dB. The achromatic behavior is highly desirable for many applications such as optical attenuators. The embodiment of the present invention provides many advantages. The modulator has extremely good wavelength flatness, is polarization independent, operates with fast response time, and consumes little power.

Figure 22:
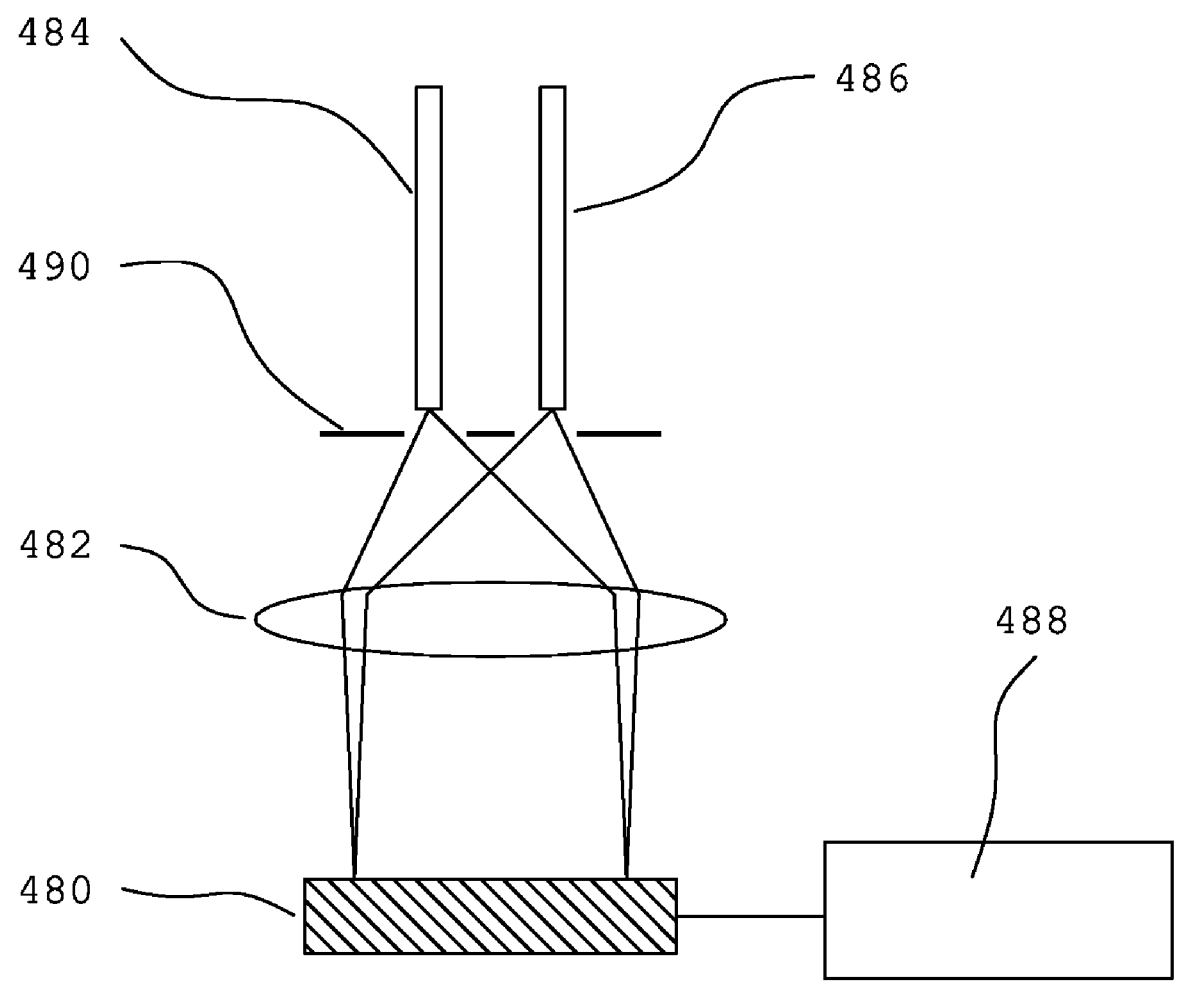
FIG. 22 shows a schematic representation of a variable optical attenuator system comprising achromatic zone plate modulators in accordance with one embodiment of the present invention.

One embodiment of the present invention is a variable optical attenuator system as shown in FIG. 22 including an achromatic zone plate modulator assembly 480, a lens system 482, an input fiber 484, and an output fiber 486. The achromatic zone plate modulator assembly 480 can be a single achromatic zone plate modulator or an array of achromatic zone plate modulators, and is controlled by an electronic circuitry 488. In addition, the system may also include an aperture or apertures 490 to eliminate unwanted light beams. An input optical signal is guided by the input fiber 484 and is coupled to the modulator assembly 480 through the lens system 482. The optical signal, after being modulated by the modulator assembly 480, returns to the output fiber 486 through the lens system 482.

A plurality of achromatic zone plate modulators can be configured as a dynamic gain equalizer (DGE) to adjust the intensity profile of an optical signal. A DGE includes a multiple achromatic zone plate modulators with each modulator assigned to a wavelength within a given band such as the C-Band, and a control circuitry regulating the attenuation of each modulators individually.

Calculation shows that the wavelength independent behavior of above achromatic zone plate modulator holds true for narrow band applications, such as C-band (1530 nm–1565 nm) or L-Band (1570 nm–1610 nm). For wideband applications, a multi-channels of achromatic zone plate modulators can be configured as a dynamic channel equalizer (DCE). Each of the achromatic zone plate modulators in a DCE covers a narrow wavelength band or sub-band. Again, with a proper electrical control signal applied to each achromatic zone plate modulator in a sub-band, the intensity profile of the wideband optical signal can be modified on a sub-band by sub-band basis.

While the present invention has been in terms of some specific examples and some specific embodiments, it will be clear that this invention is not limited to these specific examples and embodiments and various modifications or changes in light thereof will be obvious to persons skilled in the art and are to be included within the spirit and purview of this application.

The invention claimed is:

1. A diffractive modulating element for modulating and diffracting an incident wave, comprising
   a) a first plate assembly, the first plate assembly comprising a first zone plate with a set of alternate zones being reflective and the remaining zones being transmissive to the incident wave, wherein the zone plate being a Fresnel zone plate consisting of a series of concentric circular zones with the width of the zones not equal to each other and the radii Rn of the zones determined by the zone plate equation;
   b) a second plate assembly, the second plate assembly comprising a second reflective zone plate complementary to said first zone plate, the second plate assembly being positioned substantially parallel to said first plate assembly, and the second plate assembly receiving the incident wave after the first plate assembly, wherein the zone plate being a Fresnel zone plate consisting of a series of concentric circular zones with the width of the zones not equal to each other and the radii Rn of the zones determined by the zone plate equation;
   c) displacing means for changing the relative distance between the first and second plate assemblies in a direction normal to the assemblies;
   whereby the displacing means changes the relative distance between the first and second zone plates, and between a first configuration wherein the relative distance is m/2 times the wavelength of the incident wave, m is an integer number, the first and second zone plates act to reflect the incident wave as a plane mirror, and a second configuration wherein the relative distance is m/2+¼ times the wavelength of the incident wave, the first and second zone plates act to diffract the incident wave into a series of focal points along the axis of the zone plates as a phase zone plate.

2. The element of claim 1, wherein said incident wave is a wave selected from the group consisting of electromagnetic waves, matter waves, and acoustic waves.

3. The element of claim 1, wherein one of the first and second plate assemblies is a movable plate assembly and the other is a stationary assembly, and further comprises a substrate and a first supporting means for supporting the movable plate assembly.

4. The element of claim 3, wherein said displacing means comprises means for applying an electrostatic force generated by a voltage source to the movable plate assembly.

5. The element of claim 3, wherein said first supporting means comprises a plurality of linkages, a plurality of deformable resilient beams, and a plurality of posts, whereby said linkages connect said movable plate assembly to said deformable resilient beams and said posts anchor said deformable resilient beams to said substrate.

6. The element of claim 5, wherein said movable plate assembly is said second plate assembly, and said stationary plate assembly is said first plate assembly, and further comprises a second supporting means for supporting the stationary plate assembly above the movable plate assembly.

7. The element of claim 3, wherein said substrate is a transparent substrate, and wherein said movable plate assembly is said second plate assembly and said stationary plate assembly is said first plate assembly and is affixed onto said transparent substrate, therefore the first plate assembly receives the incident wave from the transparent substrate side.

8. The element of claim 7, further comprising a top cover structure, the top cover structure comprising a semiconductor substrate being coupled to said transparent substrate by an assembling means.

9. A method of modulating an incident wave, comprising
  a) forming a first plate assembly, the first plate assembly comprising a first zone plate with a set of alternate zones being reflective and the remaining zones being transmissive to the incident wave, wherein the zone plate being a Fresnel zone plate consisting of a series of concentric circular zones with the width of the zones not equal to each other and the radii Rn of the zones determined by the zone plate equation;
  b) forming a second plate assembly, the second plate assembly comprising a second reflective zone plate complementary to said first zone plate, the second plate assembly being positioned substantially parallel to said first plate assembly, and the second plate assembly receiving the incident wave after the first plate assembly, wherein the zone plate being a Fresnel zone plate consisting of a series of concentric circular zones with the width of the zones not equal to each other and the radii Rn of the zones determined by the zone plate equation;
  c) changing the relative distance between said first and second plate assemblies in a direction normal to the assemblies.

10. A method of claim 9, wherein in a first configuration the relative distance between said first and second plate assemblies is m/2 times the wavelength of the incident wave, m is an integer number, the first and second zone plates act to reflect the incident wave as a plane mirror, and in a second configuration the relative distance is m/2+¼ times the wavelength of the incident wave, the first and second zone plates act to diffract the incident wave into a series of focal points along the axis of the zone plates as a phase zone plate.

11. A method of claim 9, wherein one of said plate assemblies is caused to move relative to the other by applying electrostatic forces to at least one of said plate assemblies.

12. A diffractive modulating device, comprising a substrate and a plurality of regularly arranged individual diffractive modulating elements for modulating an incident wave, each of the diffractive modulating elements comprising:
  a) a first plate assembly, the first plate assembly comprising a first zone plate with a set of alternate zones being reflective and the remaining zones being transmissive to the incident wave, wherein the zone plate being a Fresnel zone plate consisting of a series of concentric circular zones with the width of the zones not equal to each other and the radii Rn of the zones determined by the zone plate equation;
  b) a second plate assembly, the second plate assembly comprising a second reflective zone plate complementary to said first zone plate, the second plate assembly being positioned substantially parallel to said first plate assembly, and the second plate assembly receiving the incident wave after the first plate assembly, wherein the zone plate being a Fresnel zone plate consisting of a series of concentric circular zones with the width of the zones not equal to each other and the radii Rn of the zones determined by the zone plate equation; and
  c) displacing means for changing the relative distance between the first and second plate assemblies in a direction normal to the assemblies.

13. The device of claim 12, wherein said incident wave is a wave selected from the group consisting of electromagnetic waves, matter waves, and acoustic waves.

14. The device of claim 12, wherein one of the first and second plate assemblies of each diffractive modulating element is a movable plate assembly.

15. The device of claim 14, wherein said displacing means of each diffractive modulating element comprises means for applying an electrostatic force generated by a voltage source to said movable plate assembly.

16. The device of claim 14, wherein each diffractive element further comprising a supporting means for supporting the movable plate assembly.

17. The device of claim 16, wherein said supporting means of each diffractive modulating elements comprises a plurality of linkages, a plurality of deformable resilient beams, and a plurality of posts, whereby the linkages connect said movable plate assembly to said deformable resilient beams and said posts anchor said deformable resilient beams to said substrate.

18. The device of claim 14, wherein said substrate is a transparent substrate, and wherein said movable plate assembly of each diffractive modulating element is said second plate assembly, and said stationary plate assembly of each diffractive modulating element is said first plate assembly and is affixed onto said transparent substrate, therefore the first plate assembly receives the incident wave from the transparent substrate side.

19. The device of claim 18, further comprising a top cover structure, the top cover structure comprising a semiconductor die being coupled to said transparent substrate by an assembling means.

20. The device of claim 12, wherein said diffractive modulating elements are arranged as a one-dimensional array.

21. The device of claim 12, wherein said diffractive modulating elements are arranged as a two-dimensional array on a square grid.

* * * * *